(12) United States Patent
Anima et al.

(10) Patent No.: US 9,693,186 B1
(45) Date of Patent: Jun. 27, 2017

(54) STORING INTERACTIONS BASED ON LOCATION

(71) Applicant: Google Inc., Mountain View, CA (US)

(72) Inventors: Mario Ventura Anima, Sunnyvale, CA (US); James Kevin Rodgers, Sunnyvale, CA (US); Kevin Ferguson, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/677,845

(22) Filed: Apr. 2, 2015

Related U.S. Application Data

(60) Provisional application No. 61/977,244, filed on Apr. 9, 2014.

(51) Int. Cl.
*H04W 48/18* (2009.01)
*H04W 4/02* (2009.01)
*H04W 64/00* (2009.01)
*H04W 8/18* (2009.01)

(52) U.S. Cl.
CPC .............. *H04W 4/02* (2013.01); *H04W 8/18* (2013.01); *H04W 64/00* (2013.01)

(58) Field of Classification Search
CPC ..... H04W 48/18; G01C 21/3679; G06F 21/41
See application file for complete search history.

(56) References Cited

U.S. PATENT DOCUMENTS

| | | | |
|---|---|---|---|
| 2006/0149459 A1* | 7/2006 | Matsuura | G01C 21/3679 701/540 |
| 2008/0072062 A1* | 3/2008 | Pearson | G06F 21/41 713/185 |
| 2009/0253441 A1* | 10/2009 | Wallis | H04W 48/18 455/456.3 |
| 2011/0071757 A1* | 3/2011 | Lee | G01C 21/20 701/532 |

OTHER PUBLICATIONS

Gorman, "San Francisco Giants (and most of MLB) adopt Apple's iBeacon for an enhanced ballpark experience." ©Numeson, Mar. 28, 2014, at 12:31:00 PM ET, www.engadget.com/2014/03/28/san-francisco-giants-mlb-ibeacon/.

\* cited by examiner

*Primary Examiner* — Myron K Wyche
(74) *Attorney, Agent, or Firm* — Patent Law Works LLP

(57) ABSTRACT

A system comprising a processor and a memory storing instructions that, when executed, cause the system to determine an identification for a user; determine a location of the user; determine a place associated with the location; identify an interaction capable of being performed at the place for the identification; communicate with a service to perform the interaction; and record the interaction with the service in a place history associated with the identification. The disclosure also includes similar methods and computer program products.

21 Claims, 21 Drawing Sheets

STORING INTERACTIONS BASED ON LOCATION

RELATED APPLICATIONS

This application claims the benefit of U.S. Provisional Application Ser. No. 61/977,244, filed Apr. 9, 2014, which is hereby incorporated by reference.

BACKGROUND

The present disclosure relates to storing real world interactions based on location.

The popularity and use of the Internet, web browsers, social networks and other types of electronic communication has grown dramatically in recent years. In particular, social networks now include a great amount of content including posts, images, endorsements, activity, videos, etc. Users are interested in viewing content related to particular web pages or other web information from other sources, but there are only limited ways presently to view information from social networks in other contexts.

During the same period, the use and proliferation of smart phones has increased greatly. Additionally, coarse location information can be provided by many phones, tablet or other portable communication devices. However, it remains difficult to use this coarse location information other than to show maps and provide directions. Additionally, there is much location data, but that location data is offered in technical terms, for example, GPS coordinates, Wi-Fi addresses, Wi-Fi finger prints, cell site references, etc.

SUMMARY

The present disclosure relates to systems and methods for surfacing real-time notifications based on location. One innovative aspect of the subject matter of this disclosure describes a system having one or more processors and a memory storing instructions that, when executed, cause the system to: determine an identification for a user; determine a location of the user; determine a place associated with the location; identify an interaction capable of being performed at the place for the identification; communicate with a service to perform the interaction; and record the interaction with the service in a place history associated with the identification.

In general, another innovative aspect of the subject matter described in this disclosure may be implemented in methods that include determining, using one or more processors, an identification for a user; determining, using the one or more processors, a location of the user; determining, using the one or more processors, a place associated with the location; identifying, using the one or more processors, an interaction capable of being performed at the place for the identification; communicating, using the one or more processors, with a service to perform the interaction; and recording, using the one or more processors, the interaction with the service in a place history associated with the identification.

Other implementations of one or more of these aspects include corresponding systems, apparatus, and computer programs, configured to perform the actions of the methods, encoded on computer storage devices.

These and other implementations may each optionally include one or more of the following features. For example, operations may include performing analysis of the interaction to define at least one real world moment; and storing the real world moment in the place history associated with the identification. For instance features may include retrieving the place history associated with the identification; and processing at least one real world moment from the place history to determine a suggested action for the user to perform based on location. In some instances, the operations may include retrieving a history of a user with the place; determining whether the user has visited the place more than a predetermined number of times; and updating a location-based user preference model for the user associated with the identification if the user has visited the place more than a predetermined number of times. For example, operations may include determining whether a preference modification requires user confirmation; generating and sending a preference change notification to the user for approval; receiving approval; and updating the location-based user preference model for the user associated with the identification. For instance, the operations may further include accessing a location-based user preference model for the user associated with the identification; determining whether the location-based user preference model includes a consent to perform the interaction; and wherein the interaction includes generating and sending an arrival notification indicating that the user is present at the place. In some instances, the operations may include accessing a location-based user preference model for the user associated with the identification; determining whether the location-based user preference model includes a consent to perform the interaction; and wherein the interaction includes a transaction with a service. In one feature, the transaction is one from the group of: checking in at a restaurant, paying a bill, checking into a hotel, placing an order, confirming presence, notifying others of presence, and accessing an area.

These implementations are particularly advantageous in a number of respects. For instance, the technology described herein can be used to automatically store and record user interactions at particular places. Additionally, the system, once enabled, creates a preference model so that authentication and authorization of transactions with third-party systems is automatic after a single interaction at a particular location has been executed such that the preference model has been updated. Moreover, the actions and transactions can be translated into real world moments which in turn can be used to determine future timing and possible actions to suggest to the user so that suggestions correlate to the manner in which the user is going to interact with the real world. It should be understood, however, that this list of features and advantages is not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

DETAILED DESCRIPTION

Systems, methods and interfaces for storing real world interactions based on location are disclosed. While the systems, methods and interfaces of the present disclosure are described in the context of web pages or mobile device screens and showing related posts and other content from a social network, it should be understood that the systems, methods and interfaces can be applied to other systems external to the social network for storing real world interactions based on location.

Figure 1:
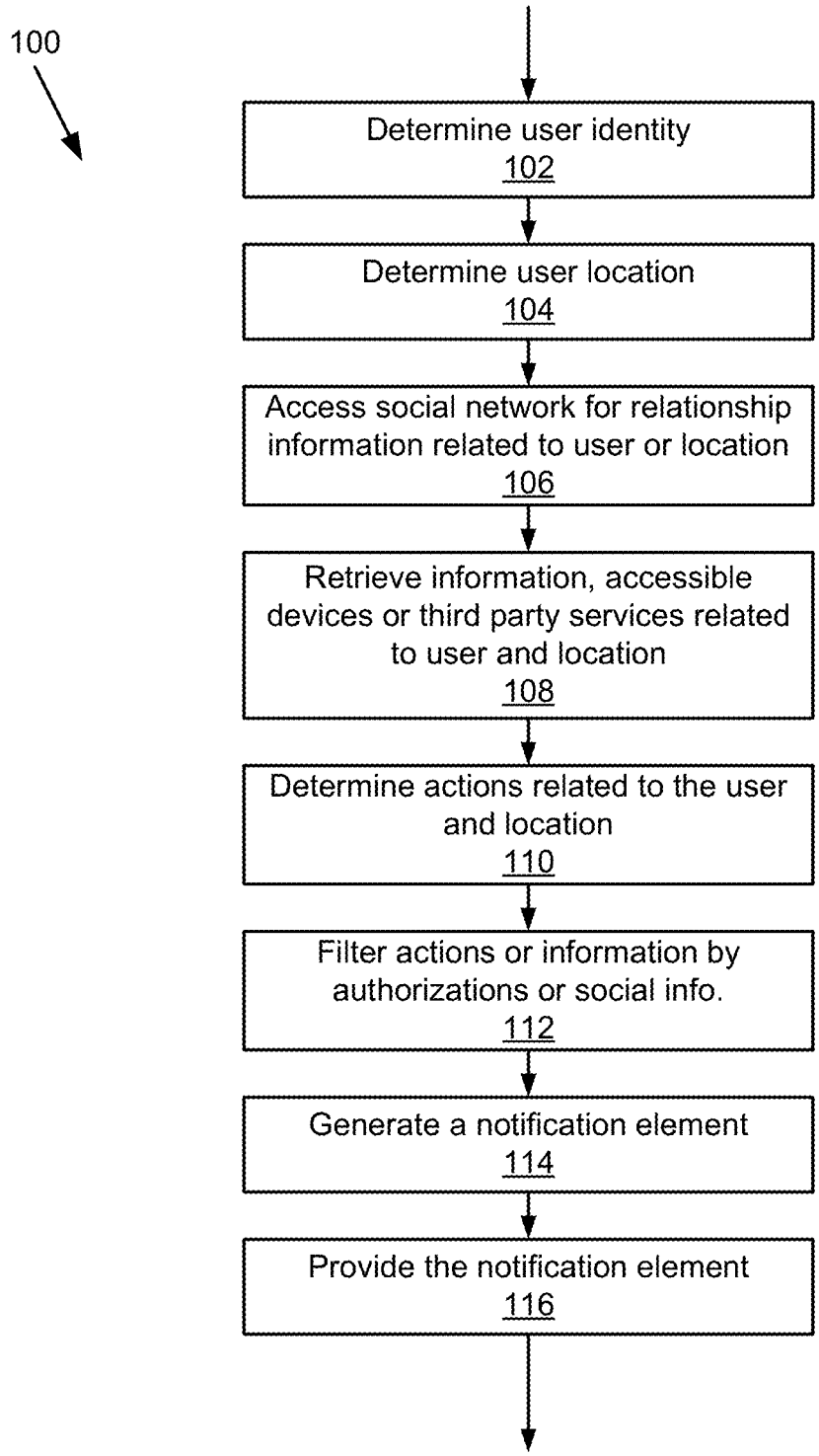
FIG. 1 is a flow chart of an example method for surfacing real-time notifications based on location.

FIG. 1 is a flow chart of an example method 100 for surfacing real-time notifications based on location. The method 100 begins by determining 102 a user identity. For example, the method 100 determines an identification for a user. This may be done by using the user ID and password associated with the portable device. This may also be done using the username and password for the social network 1509. Various other identifications of the user can be used and are one input that is used to generate the notification element. Next the method 100 determines 104 a location of the user. The location of the user can be determined using a variety of location technologies and querying the client device 1515 of the user, for example. The location of the user may also be determined by requesting the location information from the location server 1511. In addition, the method 100 may identify a place associated with the location. In some implementations, the method 100 includes associating the place with the user and the location; and storing a time and place in a history for the identification. The method 100 continues by accessing 106 a social network for relationship information related to the user or the location or both. For example, the identification of the user may be used to access the social graph of the social network for information about other users that have a relationship with the user. The relationship information may include groupings of individuals, credentials or authorizations. The method 100 may also access the social network to determine the interest of the user or other social information about the user. In another example, the location or place determined in block 104 may be used to access 106 the social network and retrieve posts, photos, conversations, videos, related to the location or place. Next the method 100 retrieves 108 a first set of information related to the location and the identification. For example, the real world interaction module 1503, in FIG. 15, may retrieve information, a list of accessible devices, a list of third-party services related to the user and the location. Next, the method 100 determines 110 any actions that the user may perform by virtue of the location and the identification of the user. For example, in the number of social network actions may be taken based upon the location of the user. Similarly, particular third-party services may be available in a particular location and therefore actions on those third-party services may be taken. Additionally, some physical devices in the location or place may be activated or interacted with and thus are identified. Example actions include: viewing a post, viewing places nearby, performing an action on a social network, interacting with a device, determining people nearby, performing a transaction, updating a profile, providing authorization or providing consent. Next the method 100 filters 112 actions or information using the relationship information obtained in block 106. In some implementations the method 100 determines 114 notification information by filtering the set of information using the relationship information, then ranks the filtered information to identify one portion of notification information to including the notification. The method then generates for a notification element and provides 116 the notification element for presentation to the user.

Figure 2:
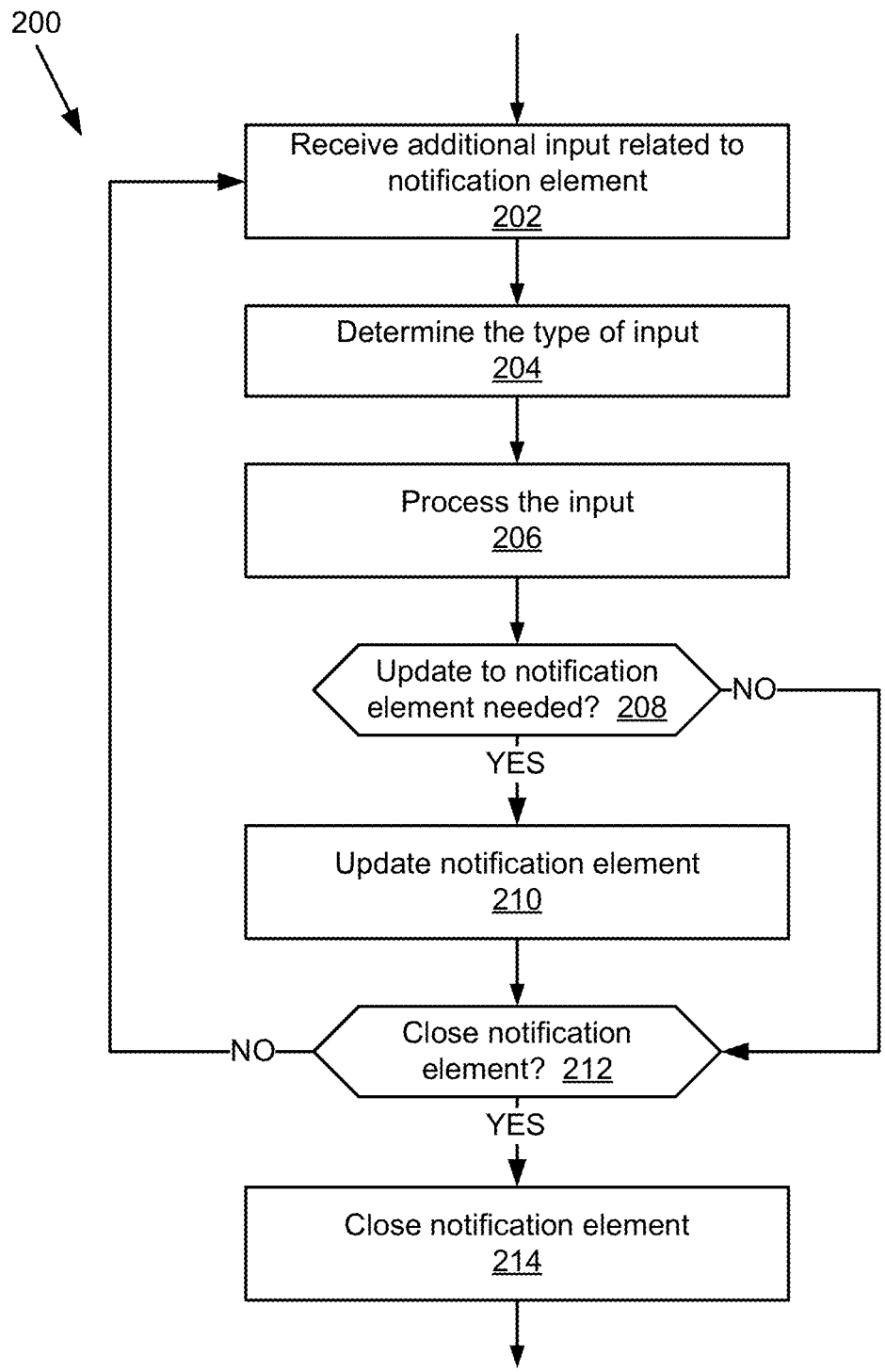
FIG. 2 is a flow chart of an example method for interacting with a surfaced real-time notification.

FIG. 2 shows an example method 200 for interacting with a surfaced real-time notification. Before the method 200 of FIG. 2 begins, the method 100 of FIG. 1 has been performed to generate a surface notification based on user location and identity. Example notifications are depicted and described below with reference to FIGS. 5A-5D. The method 200 then receives 202 additional input related to the notification element. As will be described below, any one of the user interfaces shown and described below with reference to FIGS. 5A-5D may be presented to the user. Input by the user in any one of these different contexts may be sent to the real world interaction module 1503. Next, the method 200 determines 204 the type of input received in block 202. Depending on the notification that was being presented, and the specific input of the user, a type of input may be determined. For example, the types may include a request to view the post; a request to show what's nearby; a request to share location; a request to confirm that the user is leaving the place; a request to perform an action on the social network; a request to perform an action on a device or third-party system; a request to show people nearby; and a request for another type of update, etc. The method 200 continues by processing the input. Processing the input may include performing one of the types of actions described above and generating an update to the notification element. In block 206, the method 200 performs the action associated with the type of input. Then the method 200 continues to determine 208 whether the notification element needs to be updated. If so, the notification element is updated 210. For example, the user interface may be updated by transitioning from the interface shown in FIG. 5A to another interface shown for example in FIGS. 10-14. If it was determined in block 208 that the notification element does not need to be updated, the method 200 proceeds from block 208 to block 212. In block 212, the method 200 determines whether the input was to close the notification element. If not, the method 200 returns to step 202 to receive additional input and allow the user to further interact with the updated notification interface element. However, if it was determined in block 212 that the input and instruction to close the notification element then the method 200 closes 214 the user interface element.

Figure 3A:
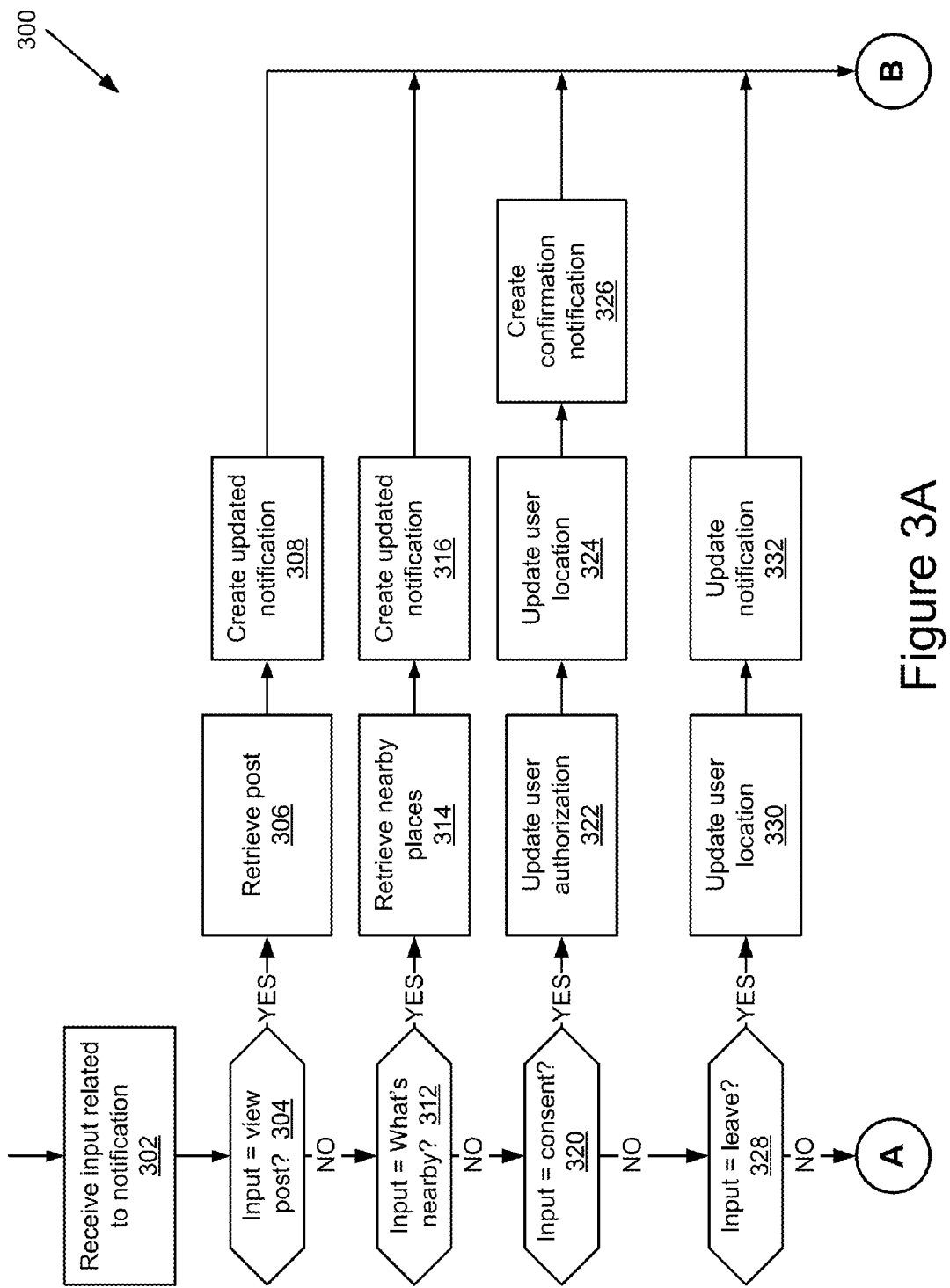
FIGS. 3A and 3B are a flow chart illustrating another example method for interacting with a surfaced real-time notification.
Figure 3B:
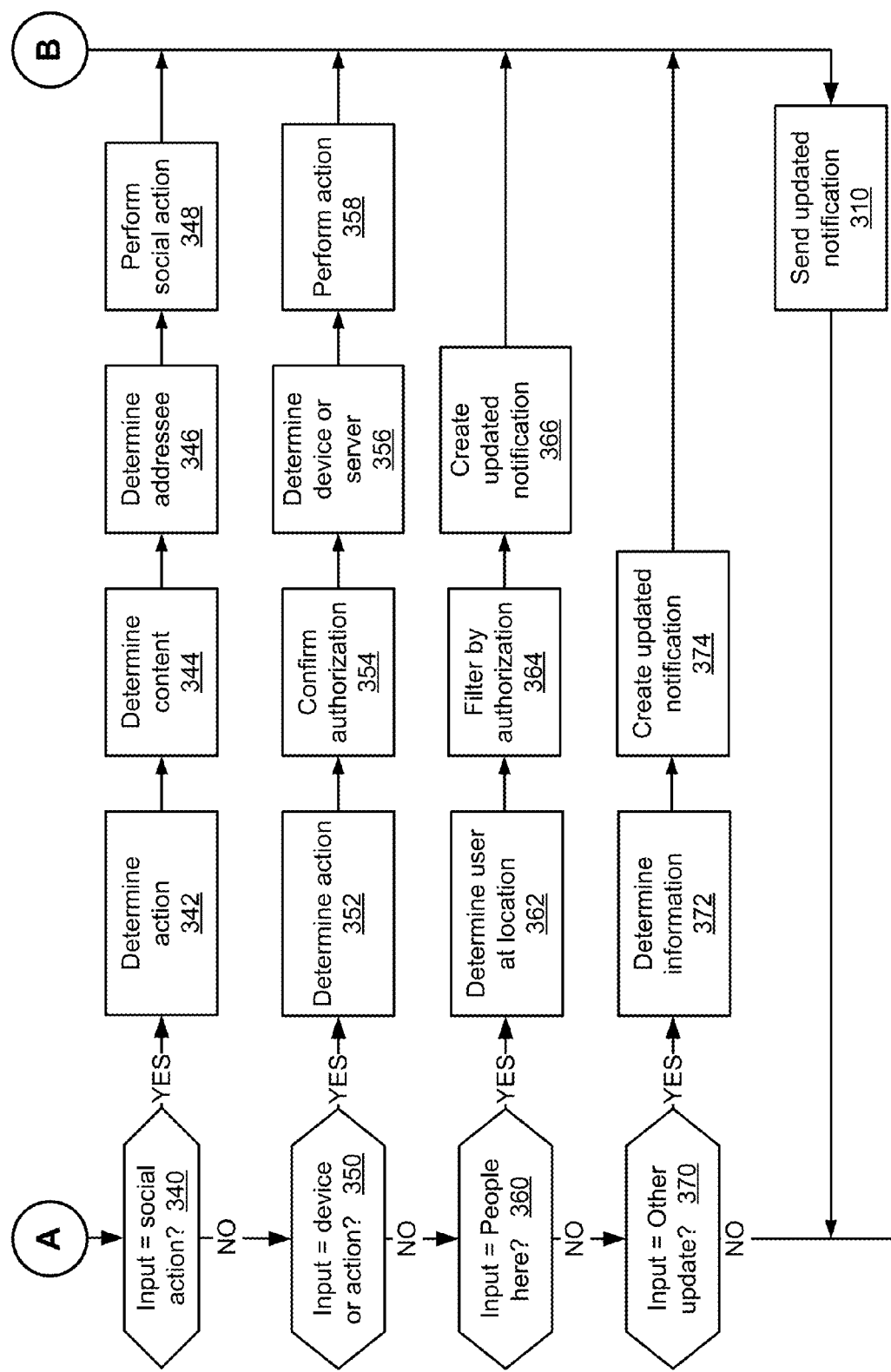

Referring now to FIGS. 3A and 3B, another implementation of a method 300 for interacting with a surfaced real-time notification will be described. Again, before the method 300 of FIG. 3 begins, the method 100 of FIG. 1 has been performed to generate a surface notification based on user location and identity. Example notifications 500, 520, 530, 540 are depicted and described below with reference to FIGS. 5A-5D. As shown in FIG. 3A, the method 300 begins by receiving 302 input related to a notification element. For example, the input may be a selection of a button of the notification; the inputting of text; the selection of a comment in the notification element; the addition of photos; the addition of gestures, marks or other interaction with the display; the input of a command to store; the selection of an icon in the notification element indicating a post, what's nearby, or inputting a consent; the detection of a location changes, or related comments, etc.

The method 300 continues by determining 304 whether the received input was a request to view a post. If so, the method 300 continues to retrieve 306 the post and create 308 an updated notification. For example, the notification shown in FIG. 5A may be updated, a post corresponding to the notification retrieved, and an updated notification created. Referring now also to FIG. 3B, the method 300 continues by sending 310 or providing the updated notification. In some implementations, the notifications can be closed in response to input from the user. The notifications may also automatically disappear after a predetermined amount of time.

If the input from the user was determined not be a request to view a post in block 603, the method 300 continues to block 312 to determine whether the input was a request to view what's nearby. If so, the method 300 updates the user's location and determines a place corresponding to the user. Then the method 300 retrieves 314 nearby places and creates a map reflecting the orientation of the nearby places to the user's location or place. In some implementations, the map may also include people in addition to places. For both places and people, the method 300 advantageously filters the information that is included on the map based upon social signals or information received from the social network application 1509 using the identification of the user. The method 300 creates 316 an updated notification from the map. The user may interact with the updated notification including a map to transition it from the collapsed view with no additional locations and information shown to an expanded view that shows more information about particular places. Referring now also to FIG. 3B, the method 300 continues by sending 310 or providing the updated notification.

If the input from the user was determined not to be a request for what's nearby in block 312, the method 300 continues to block 320 to determine whether the input was a consent for use of location information of the user as may be provided by a smart phone or other portable device. For example, a solicitation notification may be sent to the user indicating that if the user provides authorization to use her location information, relevant and valuable notifications may be provided in return. In response to the solicitation notification, the user may input their consent in block 302. If the input was determined to be a consent, the method 300 updates 322 the user authorization information and determines or updates 324 for the location of the user. The surface notification module 1503 may also be updated so that the user can now be identified by others when they have co-presence or are located nearby each other. Then the method creates 326 the confirmation notification (not pictured) indicating to the user that their location is visible and will be used to surface information related to their location and that they will be visible to others in their social network. Referring now also to FIG. 3B, the method 300 continues by sending 310 or providing the updated notification.

If the input from the user was determined in block 320 not to be a consent, the method 300 continues to block 328 to determine whether the input was that the user is leaving the current location. If so, the method 300 updates 330 the user's location to indicate that they are leaving or are no longer at a place. This is particularly advantageous because it allows the overall system to provide real-time information about the presence or proximity of other users to their friends, colleagues or other people they may be interested in engaging with in person. Then the method 300 creates 332 an updated notification to indicate that a particular individual has left. For example, several people are together at a conference. A first user may indicate that he or she is leaving and that notification can be broadcast to other users who have a connection to the first user that are at the conference. This is especially advantageous if people who are not yet at the conference received the location information because they have an ability to modify their plans based on more current information and may decide not to join the conference because the first user is no longer there. Referring now also to FIG. 3B, the method 300 continues by sending 310 or providing the updated notification.

Referring now also to FIG. 3B, if the input from the user was determined not to be that the user is leaving the current location in block 328, the method 300 continues to block 340 to determine whether the input was a request to perform an action on a social network. For example, the notifications in FIGS. 5A-5D may include any number of buttons to perform actions on a social network. If the user interacts with the notification to indicate that she would like to perform a social action, an updated notification is provided to the user. For example, if the user indicates that she would like to share a picture, the notification can transition from that of FIGS. 5A-5D to a photo sharing notification. The method 300 continues by determining 342 the action to be performed. For example, the action could be to create a new post, to share a photo, to re-share a post, to make an endorsement, or any other action possible on the social network. The method 300 then determines 344 the content for the action and determines 346 the addressees, if any for the action. Next the method performs 348 the action. For example, the social network interface module 1708 allows the network surfacing module 1503 to receive input from notifications and send them to implement actions on a social network application 1509. Then the method 300 creates a confirmation notification (not pictured) and sends 310 or provides the updated notification.

If the input from the user was determined not to be a request to perform an action on a social network in block 340, the method 300 continues to block 350 to determine whether the input was a request to perform an action by a device or third-party system. For example, from a notification, a user is able to interact with physical devices to perform tasks, for example unlocking doors, turning devices on or off, modifying the settings of devices, etc. From a notification a user is also able to control or interact with third-party systems to perform actions or conduct transactions. The method 300 continues by determining 352 the action to be performed. The method 300 then confirm 354 that the user has authorization to interact with the device and perform the desired action or interact with the third-party system and perform the transaction. The real world interaction module 1503 advantageously uses the identification of the user to confirm authorization. For example the user identity module 1704 of the real world interaction module 1503 can be used to perform these tasks. Next, the method 300 determines 356 the device or third party server 1507 with which the user wants to interact and initializes communication. Then, the real world interaction module 1503 performs 358 the action requested by the user. Then, the method 300 creates a confirmation notification (not pictured) and sends 310 or providing the updated notification.

If the input from the user was determined not to be a request to perform an action by a device or third-party system in block 350, the method 300 continues to block 360 to determine whether the input was a request to identify people nearby. If so, the method 300 uses the current location of the user and determines 362 others users near that location. Next, the method 300 retrieves information from the social network application 1509 and uses that information to filter other users near the location based on authorizations that the requesting users have as well as by strength of relationship to the user. In some implementations, the identified users near the location are placed in rank order by relevance and strength in relationship to the requesting user. Those users above a predetermined threshold are selected for inclusion in the notification. Next the method 300 creates 366 an updated notification including the people selected in block 364 for inclusion. The notification may be a list of people nearby. In some implementations, markers with names of people may be placed on a map to provide their relative position to the current user. Then the method 300 sends 310 or provides the updated notification.

If the input from the user was determined not to be a request to identify people nearby in block 360, the method 300 continues to block 370 to determine whether the input was a request for any other update, information or action. If so, the method 300 to determines 372 the information necessary and creates 374 an updated notification. Then, the method 300 sends 310 or provides the updated notification.

Figure 4:
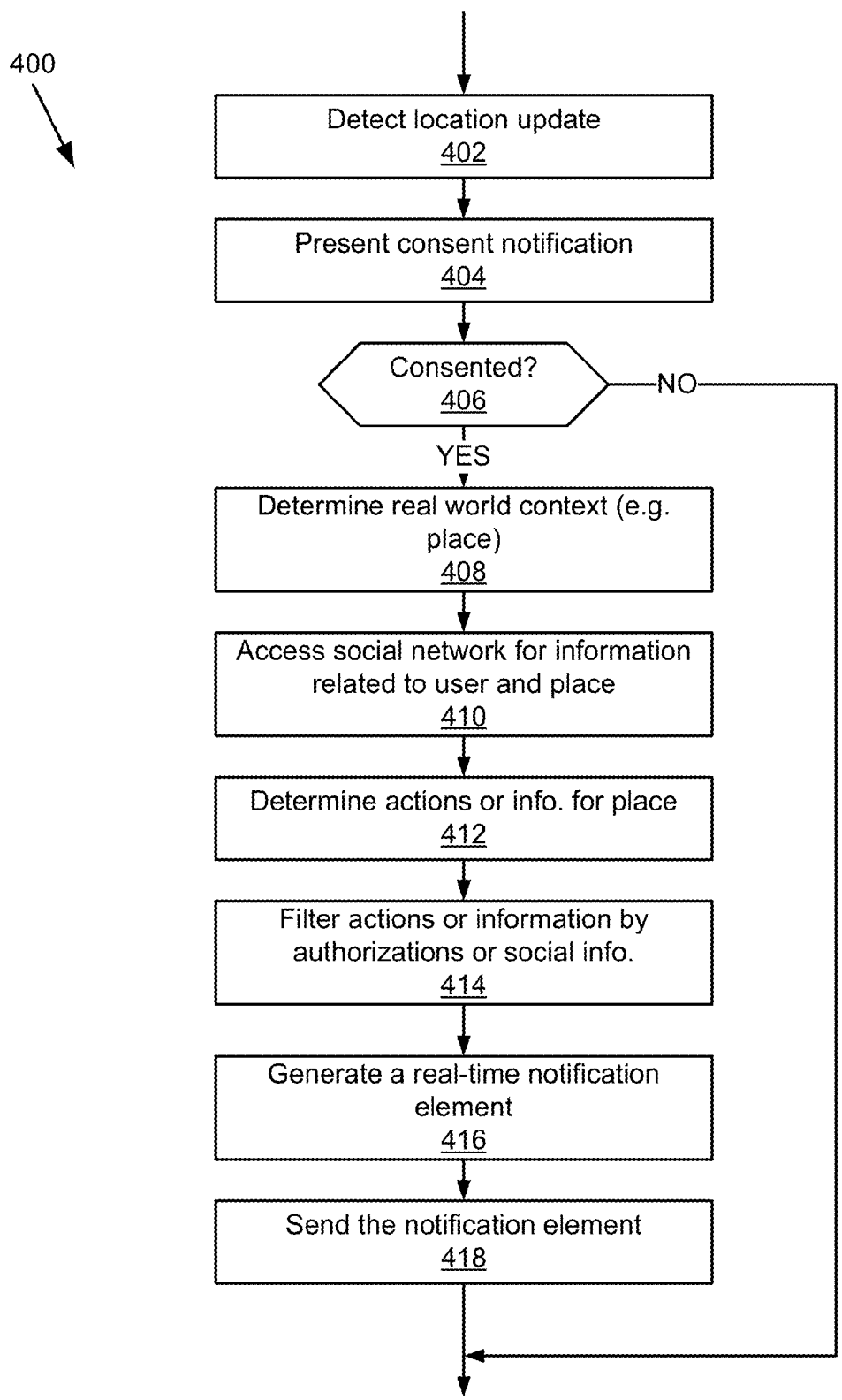
FIG. 4 is a flow chart of an example method for detecting location and generating a real-time notification.
Figure 11:
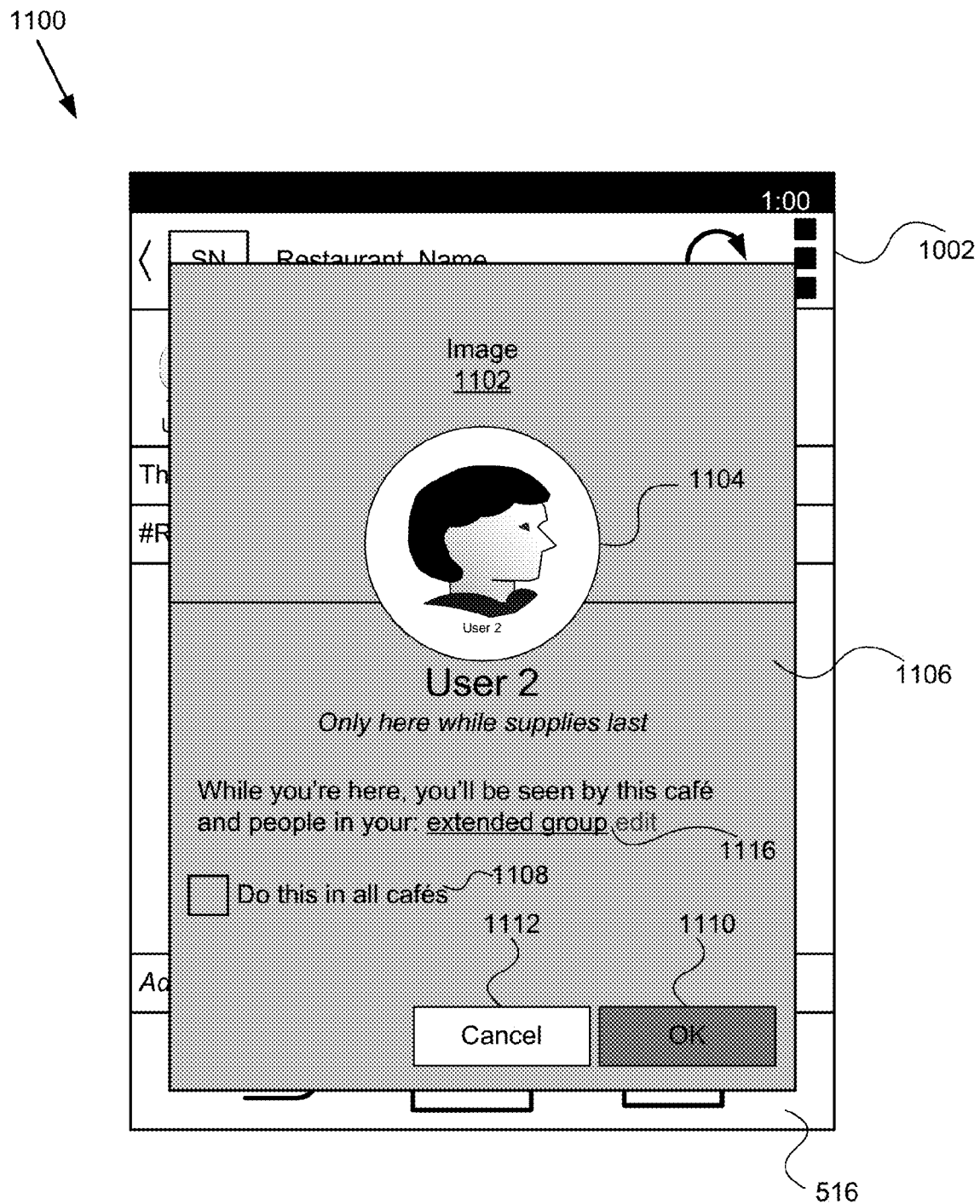

Referring now to FIG. 4, an example method 400 for detecting location and generating a real-time notification will be described. The method begins by detecting 402 a location update. One particular advantage of the present disclosure is that the real world interaction module 1503 can provide real-time notifications of people, activities, and other events that are relevant to a particular user based on his or her location. As location of the user is modified, the real world interaction module 1503 retrieves and computes information for notifications. If the information is above a particular threshold, then that information is presented to the user in a notification. For example, location updates may be provided by the smart phone of a particular user. The location update may be sent from the smart phone (client device 1515) to the real world interaction module 1503. Next, the method 400 presents 404 a consent notification. An example consent notification is shown in FIG. 11. The real world interaction module 1503 receives the user's input, and if the user did not consent, the method 400 is complete and ends. On the other hand, if the user did consent, the method 400 continues to block 408. It should be understood that once the user has consented indefinitely, blocks 404 and 406 can be omitted from the real time notification process. The method 400 continues by determining 408 a real world context. This can be as simple as determining a place associated with location or he can be more complex including determining how frequently the user visits a place, when he last visited the place, where other users are relative to that place, or various other information that reflects user intention and his or her relationship with the real world. Next, the method 400 accesses 410 the social network for information related to the place and the user, determines 412 actions or information for the place, and filters 414 the actions or information by authorizations or other social information. The steps are similar to those described above with reference to FIG. 1. Next the method 400 generates 416 a real-time notification element, and sends 418 the notification to the user.

Referring now to FIGS. 5A-5D and 13-17, various implementations of the notification element on an example screen of a smart phone will be described. In particular, FIGS. 5A-5D show example notification messages 500, 520, 530 and 540. The real world interaction module 1503 processes the user information including location, identity and relationships, and, based on a particular location, may surface an introductory notification (e.g. the examples presented in FIGS. 5A-5D).

Figure 5A:
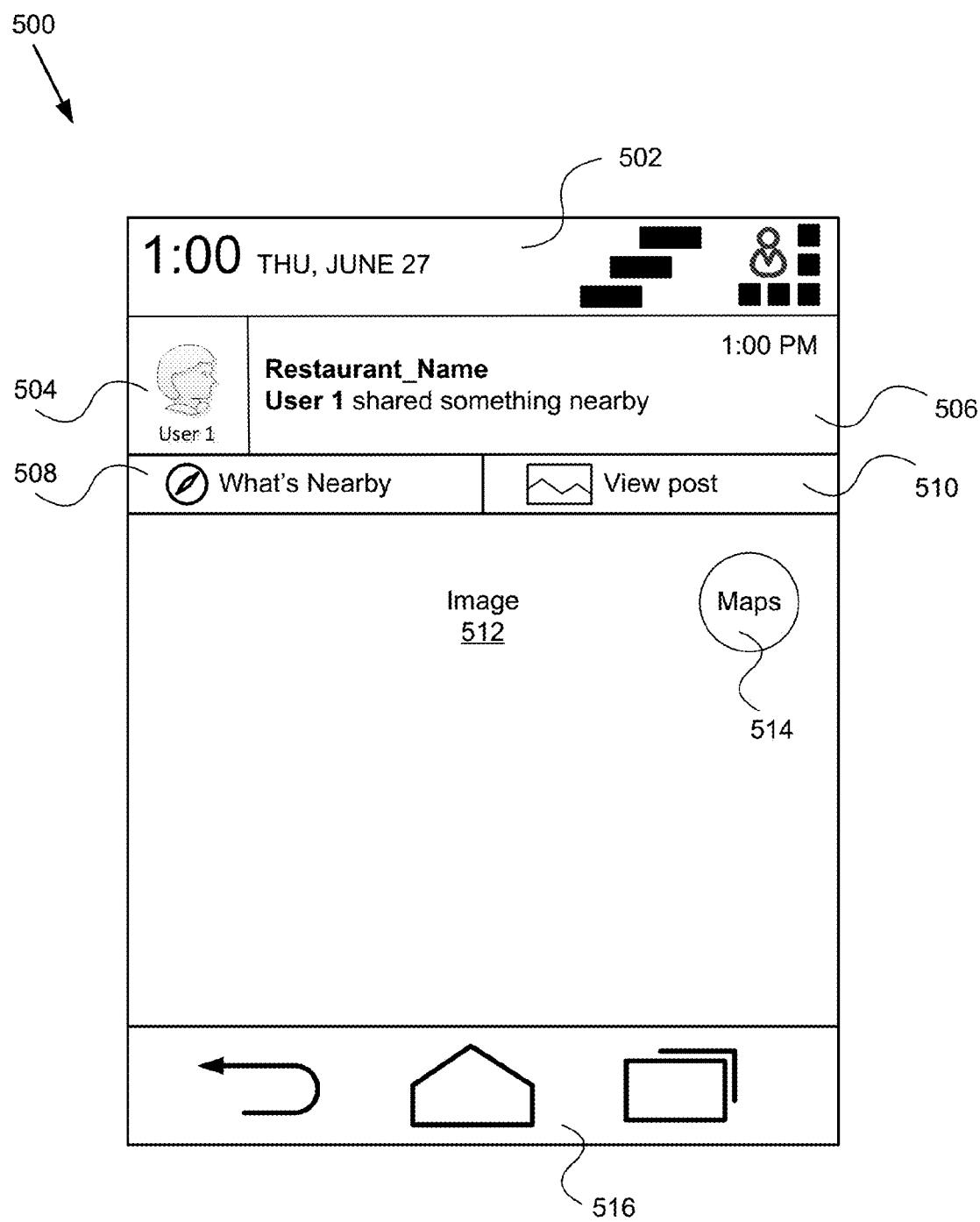
FIGS. 5A-5D are graphic representations of example user interfaces for surfacing real-time notifications and interacting with them according to some implementations of the present disclosure.

FIG. 5A shows an example notification element 500 for display on a smart phone. Throughout the description that follows the terms notification and notification element will be used interchangeably for convenience and ease of understanding. FIG. 5A is a graphical representation of the display of the smart phone. The notification 500 includes a header 502 with time, date, status indicators and other icons for navigating or performing other actions. The notification 500 also includes information 506 forming the notification. In this example, the notification is about a nearby restaurant called "Restaurant_Name" and the fact that a user, User 1, shared something nearby. The notification 500 also includes an image or icon 804 used by User 1 as his identifier on the social network application 1509. For this example notification 500, a pair of buttons 508, 510 are included to transition to other notifications that allow the user to view what's nearby or view the full post, respectively. The notification 500 also includes an image 512 associated with Restaurant_Name. Positioned over a portion of the image 512 is a button or link 514 that allows the user to transition to a notification (not pictured) that shows the location of the Restaurant_Name on a map. Finally, the notification element 500 includes a footer having a series of buttons that are selectable to perform various actions.

Figure 5B:
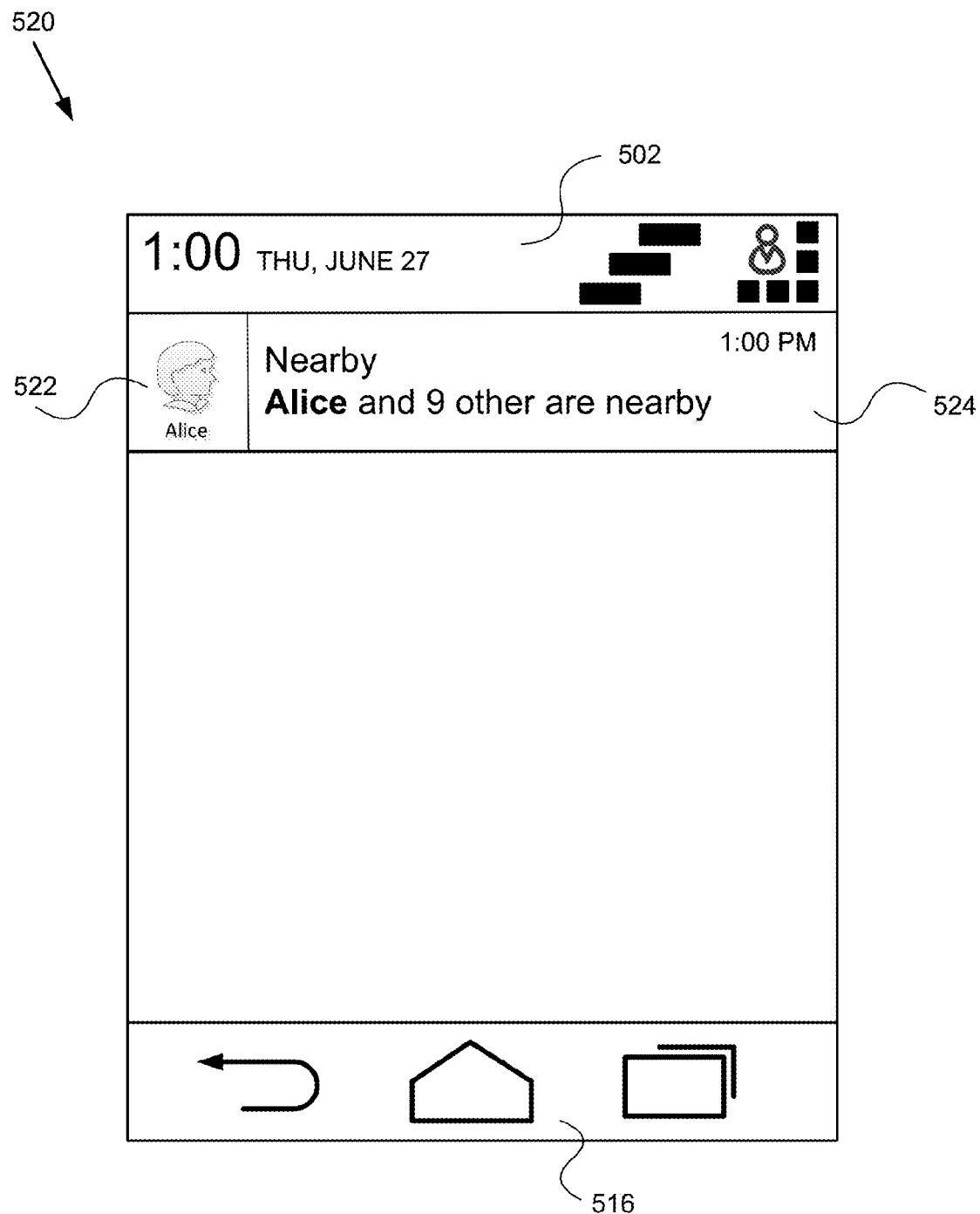

FIG. 5B shows another example notification element 520. This example notification element 520 has a very basic form. The notification element 520 includes the header 502 and footer 516 similar to that described above with reference to FIG. 5A. The notification 520 includes a simple message 524 that a user 822, the notification "Alice," and nine others are nearby the present location of the user. The notification 520 also includes an icon or image representing Alice.

Figure 5C:
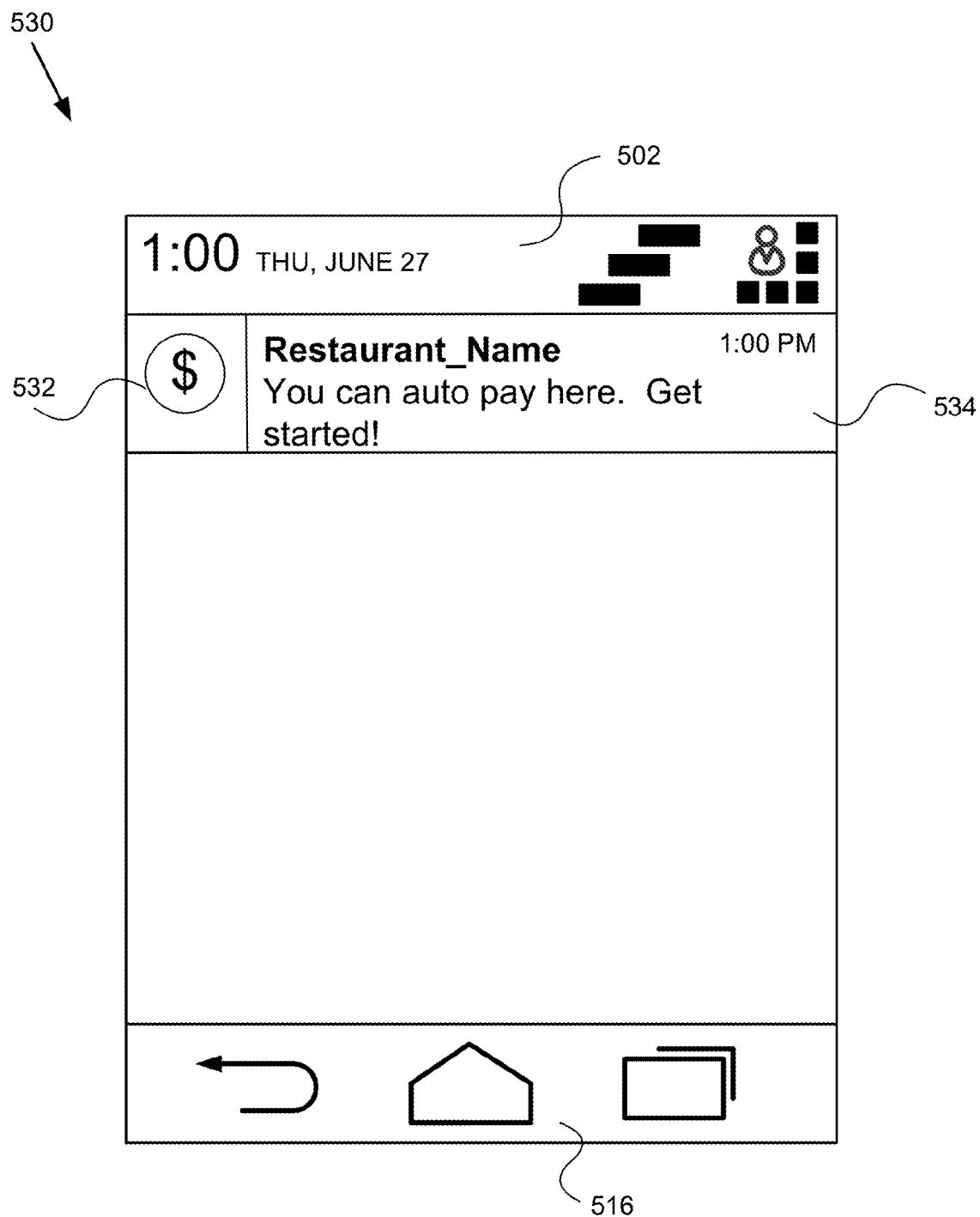

FIG. 5C is another example notification 530. This is an example notification 530 that can be auto generated by the real world interaction module 1503 to notify the user that they can use an electronic payment system via their smart phone to pay for any meals at the restaurant in which they are located. In this case, the user is at Restaurant_Name. Sometime during their visit to Restaurant_Name, the real world interaction module 1503 generates and sends the example notification 530. The notification 530 includes a header 502 in a footer 516 similar to the other notifications 500, 520 described above. The notification 530 also includes a message 534 indicating the restaurant's name, Restaurant_Name, and text indicating auto pay can be used here. The notification 530 also includes a button 532 selectable by the user to transition to transaction screens to affect payment via auto pay.

Figure 5D:
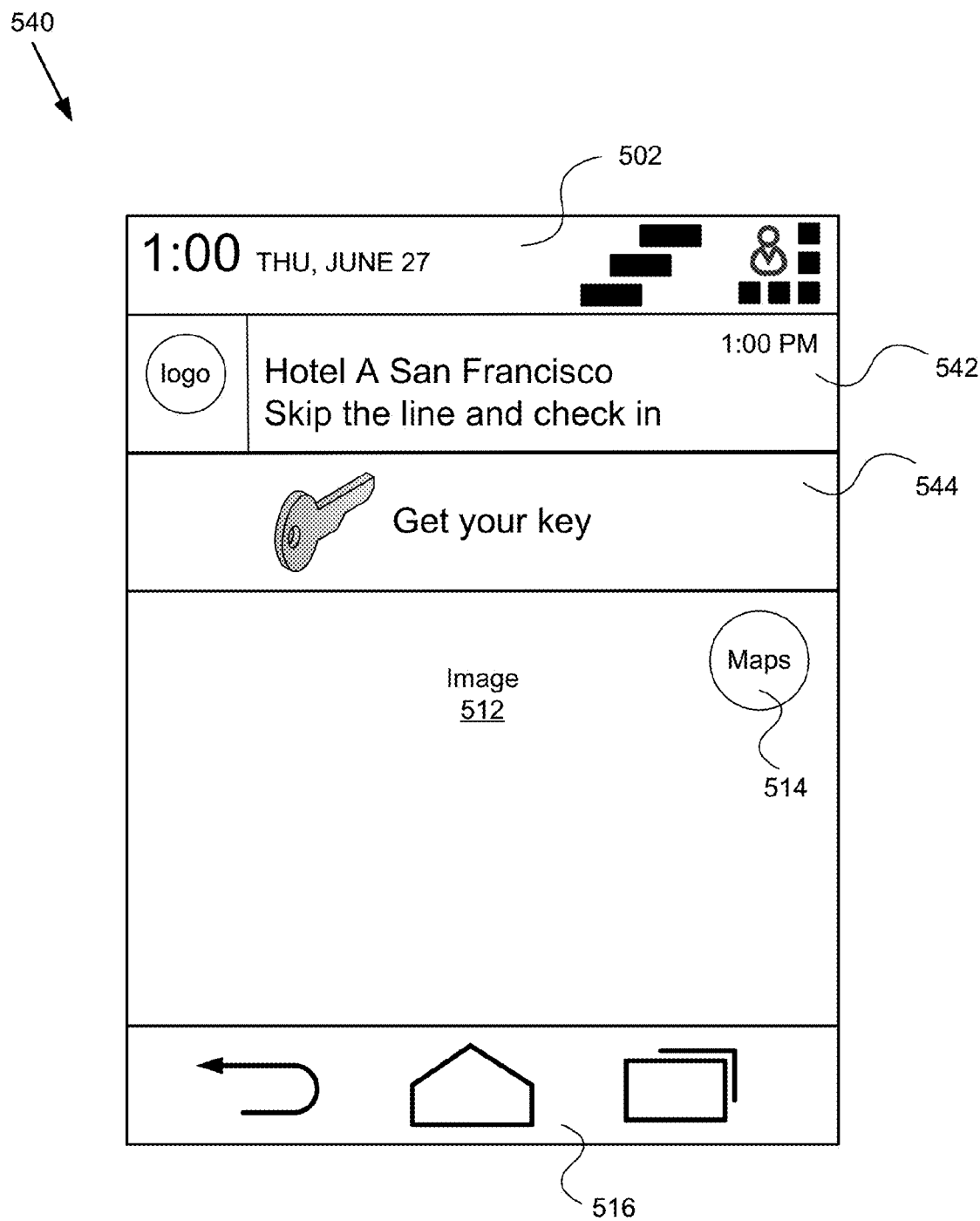

FIG. 5D is yet another example of the notification 540. Again, this notification 540 includes a header 502 and a footer 516 similar to the other notifications. The notification 540 may also include an image 512 representing a hotel and a map button 514 to transition to a map showing location of the hotel. Located proximate the header 502, this notification 540 includes a message 542 with a logo of the hotel, a time, and an indication that "Hotel A" in San Francisco allows the user to use his or her mobile device to check-in to the hotel. The notification also includes a selectable button 544 that allows the user to transition to transactions that will allow the user to check into the hotel and obtain a room assignment and the key to the room. This example notification 540 may be presented to a user just after he or she lands at the airport on an air flight to San Francisco. Or, the system 1500 may present this notification 540 with knowledge from the social network that the user has a reservation at this hotel. Similarly, this notification may be presented to the user as he or she comes within a predetermined distance of the hotel.

Figure 6:
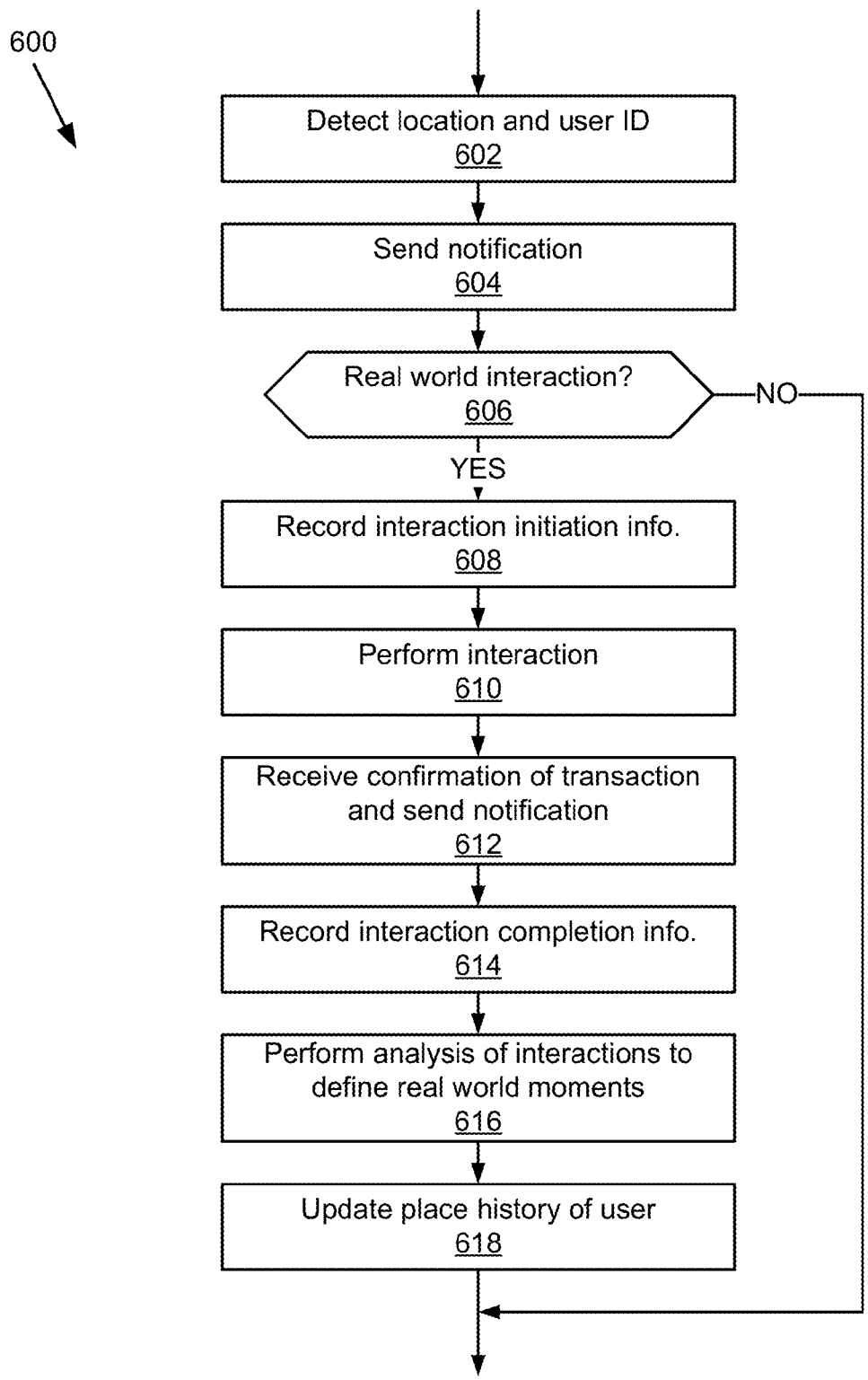
FIG. 6 is a flow chart of an example method for storing real world interactions based on location.

Referring now to FIG. 6, a flow chart of an example method 600 for storing real world interactions based on location is shown. The method 600 begins by detecting 602 a location and a user identification. Although not shown, the method 600 may also determine the place associated with the location. Next, the method 600 sends 604 the notification to initiate the user's interaction with the place. In some implementations, the user may immediately begin interacting with the place without need for a notification to be sent. The real world interaction module 1503 observes activity at the place performed by the user. In a broadest sense, the real world interaction is any action, transaction or communication related to place. For example, real world interactions may include actions taken on a social network, for example posting, commenting, re-sharing, endorsing, etc. while at a place. Real world interactions may also include actions by the user, for example taking photos at a place, recording at a place, placing or receiving a telephone call at a place, sending or receiving a text message at a place, inputting their mood to a portable device, etc. Further, real world interactions may include various transactions with systems that are outside of the real world interaction module, for example making a payment, placing an order, checking in, etc. Next, the method 600 determines 606 whether the user has performed any real world interactions. If not, the method 600 continues to after block 618. Alternatively, the method 600 could loop back to block 606 to continue to observe and determine whether there are any real world interactions. On the other hand, if the method 600 determined in block 606 that there was a real world interaction, the method 600 continues to record 608 the interaction initiation information. For example, if the user is performing the task of paying for a bill with an automated payment service, the real world interaction module 1503 records the time at which the transaction was started, the user identification, the place, and identifier for the third party payment service and other information related to initiation of the transaction. The method 600 continues by performing 610 the interaction. For example, the social network interface module 1708, the third-party service or system module 1722 or the device access module 1720 may cooperate with other systems to complete the interaction. The method 600 continues with the real world interaction module 1503 receiving 612 confirmation of the transaction, generating a notification, and sending the notification to the user. Next, the method 600 records 614 the interaction completion information. In some implementations, this information is similar to the interaction initiation information with a time, a place, a user identification, a third-party identification, if applicable, and other information (e.g., a confirmation number). In some implementation blocks 608 and blocks 614 record the information in the places and real world context data storage 1726 for use by other modules of the real world interaction module 1503. The method 600 may optionally continue to perform 616 analysis of interactions to define real world moments. For example, real world moments like "arrival," "departure," "purchase," "order," "check-in," "turn on," and "turn off" may be determined through analysis of the interaction, action and transaction data. Next, the method 600 updates 618 a place history of the user by adding the real world moments identified in block 616 and stores them along with a time and a place in the history for the user.

Figure 7:
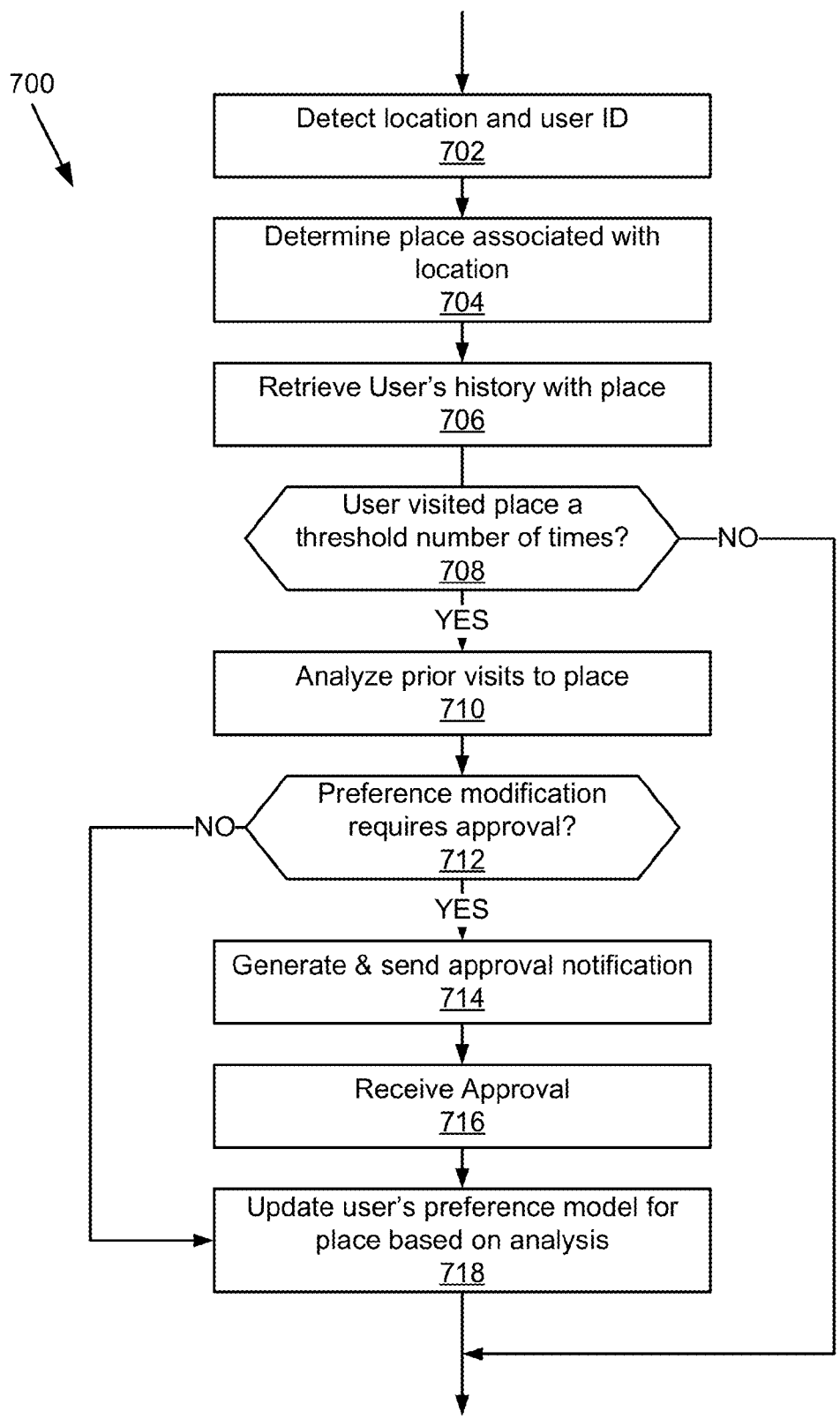
FIG. 7 is a flow chart of an example method for creating a user preference model from interactions based on location.

Referring now to FIG. 7, an example method 700 for creating a user preference model from interactions based on location is shown and described. The method 700 begins by detecting 702 the location and a user identification. Next, the method 700 determines 704 a place associated with the location detected in block 702. The method 700 then retrieves 706 a user's history with the place identified in block 704. Then, the method 700 determines 708 whether the user has visited the place a threshold number of times. It should be understood that the threshold could be zero in which case the first time a user visits any new place, steps 710 through 718 are performed. In other implementations, repeated visits to a particular place are required before the preference model for that place is modified. It should be understood that the required number of visits before changing the preference model can be different for different places. If it is determined in block 708 that the user has not visited the place a threshold number of times, the method 700 continues without modifying the user preference model for this place. On the other hand, if it is determined in block 708 that the user has visited the place a threshold number of times, the method 700 continues to block 710. In block 710, the method 700 analyzes prior visits if any, to the place. The activity of the user at a particular place is reviewed and analyzed 710 to see whether they have performed repeated behaviors; and therefore, preferences should be established for this place. This is particularly advantageous because the real world interaction module 1503 is actually learning and recording user behavior, and thus, adapting the interaction of the system to the most likely behavior of the user. For example, if the user is always in incognito mode and does not share their location at this place, the user preference model can be updated so that the user is invisible every time they are at this place. On the other hand, if the user has always made their presence public when visiting this place in past visits, the user preference model can be updated to automatically reveal the user's presence when they visit this place. Similarly, other preferences including with whom information is shared, and which third-party services that are automated for transactions can be set as part of the user's preference model. The method 700 continues by determining 712 whether the preference modification suggested by the analysis in block 710 requires approval. In certain circumstances (e.g., financial transactions), user consent may be required before modifying a preference in the preference model for the user. If an approval is not required, the method 700 proceeds directly to block 718 to update the user's preference model as will be described below. On the other hand, if the modification to the user preference model requires approval, the method 700 continues by generating 714 and sending an approval notification to the user. The user may then respond by inputting their roof approval via their smart phone. The method 700 then receives 716 the approval. In some implementations, the real world interaction module 1503 may have an audit function and record the sending of approval notifications and the receipt of approvals in the event that transactions or actions are subsequently questioned as being authorized. If the approval is received or approval was not required, the method 700 updates the user's preference model for the place based on the analysis of block 710.

Figure 8:
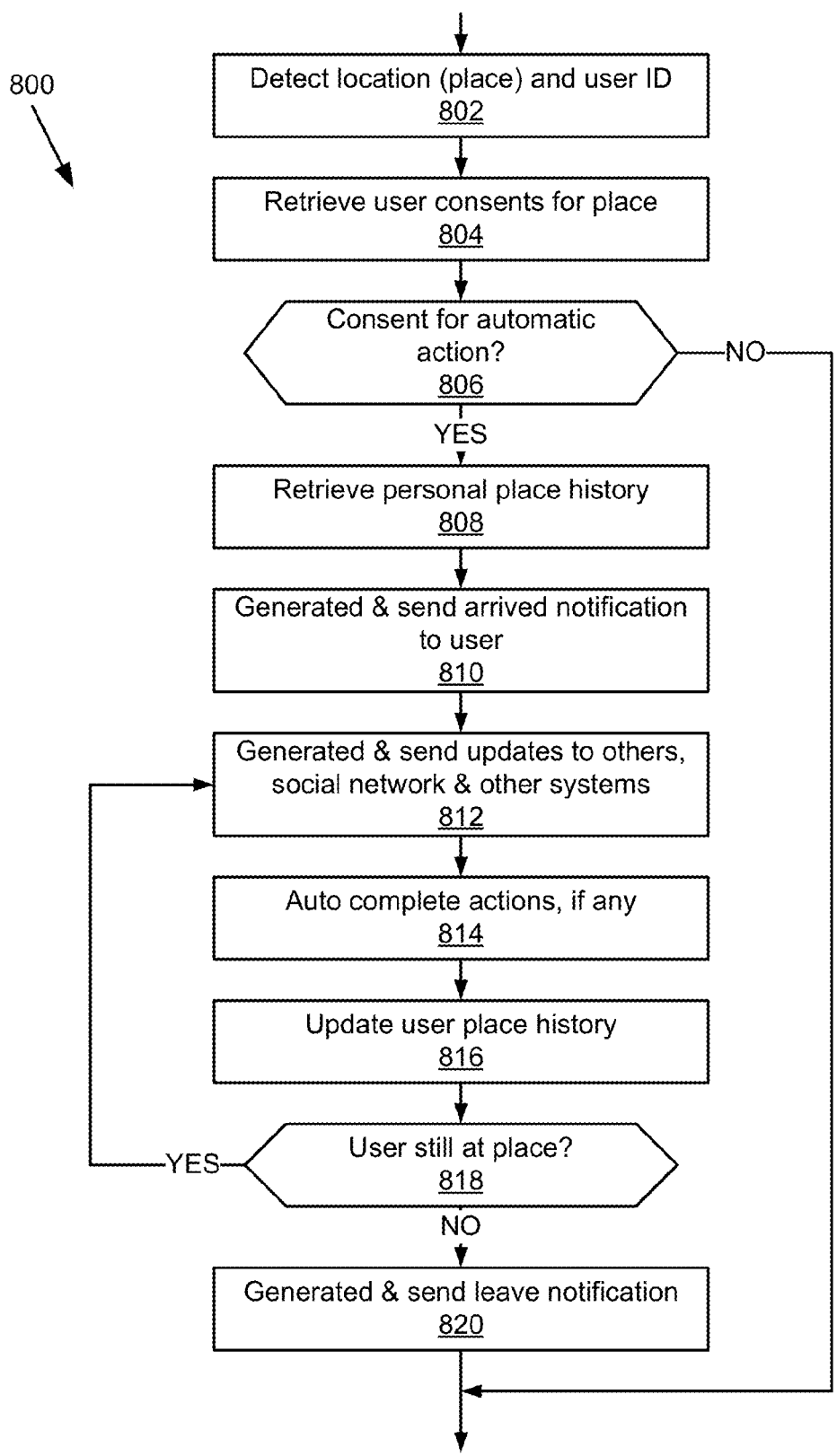
FIG. 8 is a flow chart of an example method for automated performance of an action and sharing of information based on location.

Referring now to FIG. 8, an example method 800 for automated performance of an action or sharing of information based on location is shown. The method 800 begins by detecting 802 the location and the user identification. The method 800 also determines a place associated with the location detected. Next, the method 800 retrieves 804 user consents for the place identified in block 802. For example, the consents for the user identified in block 802 can be retrieved from the place preference module 1732 or the places and real world context data storage 1726. The method 800 then determines 806 whether the user has any consents set for the place. For example, the user may have set a consent to reveal his or her presence in a particular location; a consent to share other information; a consent to automatically post the activity of the user while at the place; a consent to automatically generate notifications regarding activities available at the place; a consent to conduct transactions automatically with third-party systems or services; other consents; or combinations of any of the aforementioned consents. If the method 800 determined in block 806 that there are no consents for automatic action, the method 800 is complete. On the other hand, if the method 800 determined in block 806 that there are consents for automatic action, the method 800 proceeds to block 808. In block 808, the method 800 retrieves the place history of the user for the detected place. If the user has consented to revealing their presence at the place, the method 800 generates and sends 810 and arrival notification to the user. Example notifications will be described in more detail below with reference to FIG. 10-14. Similarly, if the user has consented to allow other users, the social network or other systems to be notified of presence, the method 800 automatically generates and sends 812 updates to others, the social network and other systems in accordance with on the user's preferences. Next, the method 800 automatically completes 814 any actions or transactions in accordance with the user's consents and preferences. For example, if the user is at a restaurant and has set auto pay, the real world interaction module 1503 will perform a transaction to pay the restaurant from the user's electronic payment service for meals at the restaurant. Likewise, if the user is at a hotel and has set auto check in, the real world interaction module 1503 will perform a transaction with the hotel's system to check the user in and obtain a room assignment and electronic key. The method 800 updates 816 the place history of the user to reflect the activities performed in blocks 810 to 814. Next, the method 800 determines 818 whether the user is still at the place. If so, the method 800 loops through blocks 812, 814 and 816 to perform automatically any number of communications, interactions, actions and transactions while at the place. If the user is no longer at the place, the method 800 generates and sends 820 a leave notification. It should be understood that the method 800 described in FIG. 8 is particularly advantageous because as the user returns to specific places, the real world interaction module 1503 can automatically perform various tasks, thereby eliminating the need for a user to access their smart phone while at the place. Moreover, as the user returns to specific places and repetitively performs the same tasks, the real world interaction module 1503 can also analyze that behavior and send notification suggestions to make such repeated behaviors automatic.

Figure 9:
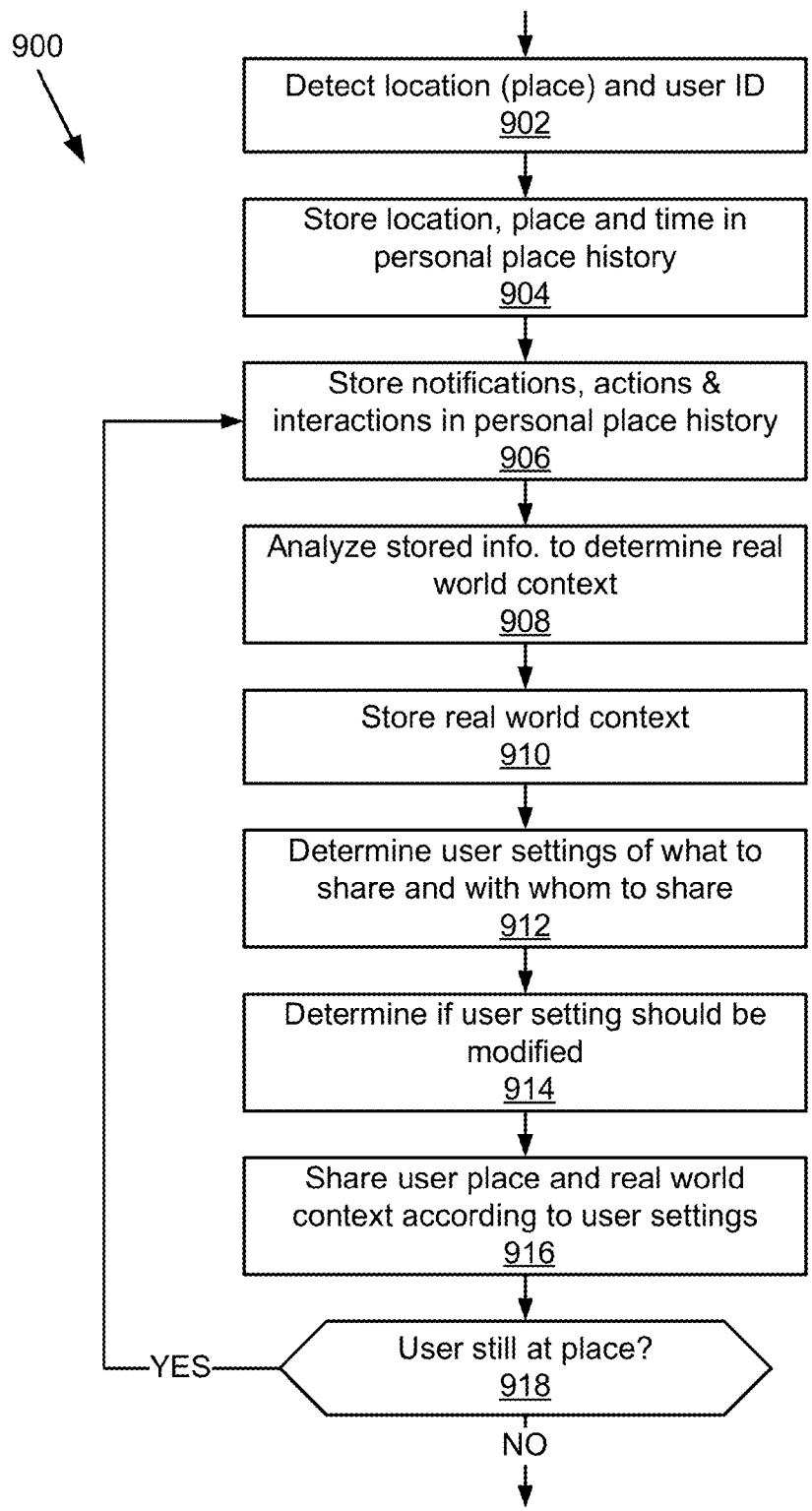
FIG. 9 is a flow chart of an example method for creating and storing a real world identity.

Referring now to FIG. 9, an example method 900 for creating and storing a real world identity is shown. The method 900 begins by detecting 902 a location, determining a place associated with the location and detecting the user's identification. The method 900 then stores 904 the location, place and time in the personal place history for the user. While the user is at the determined place, the method 900 stores 906 notifications, actions, interactions and transactions in the place history for the user. The method 900 then analyzes 908 the information stored in the personal place history of user to determine real world context. The user's interactions with the real world including performing actions like writing at a location, departing from location, checking in at a hotel, paying a bill at a restaurant, etc. can be determined by analyzing the transaction and action data. The method 900 then stores 910 the real world context. For example, the real world context and identity module 1728 can store the real world context in the places and real world context data storage 1726. The method 900 determines 912 user settings for of what to share and with whom to share it. Then the method 900 determines 914 whether the user settings should be modified. The real world interaction module 1503 is particularly advantageous because based on user behavior and place information collected, the real world interaction module 1503 modifies how the system 1500 will interact with the user on a place by place basis. Thus, to the end-user the behavior of the system 1500 and the actions that are taken appear to be automatic and seamless. The method 900 then shares 916 the user's presence at a place and the real world context in accordance with the user setting. Next the method 900 determines 918 whether the user is still at the place. If the user is at the same location, the method returns to loop through blocks 906 to 916. However if the user has left the place, the method 900 is complete and can be reinitiated when a new location for the user is detected.

Figure 10:
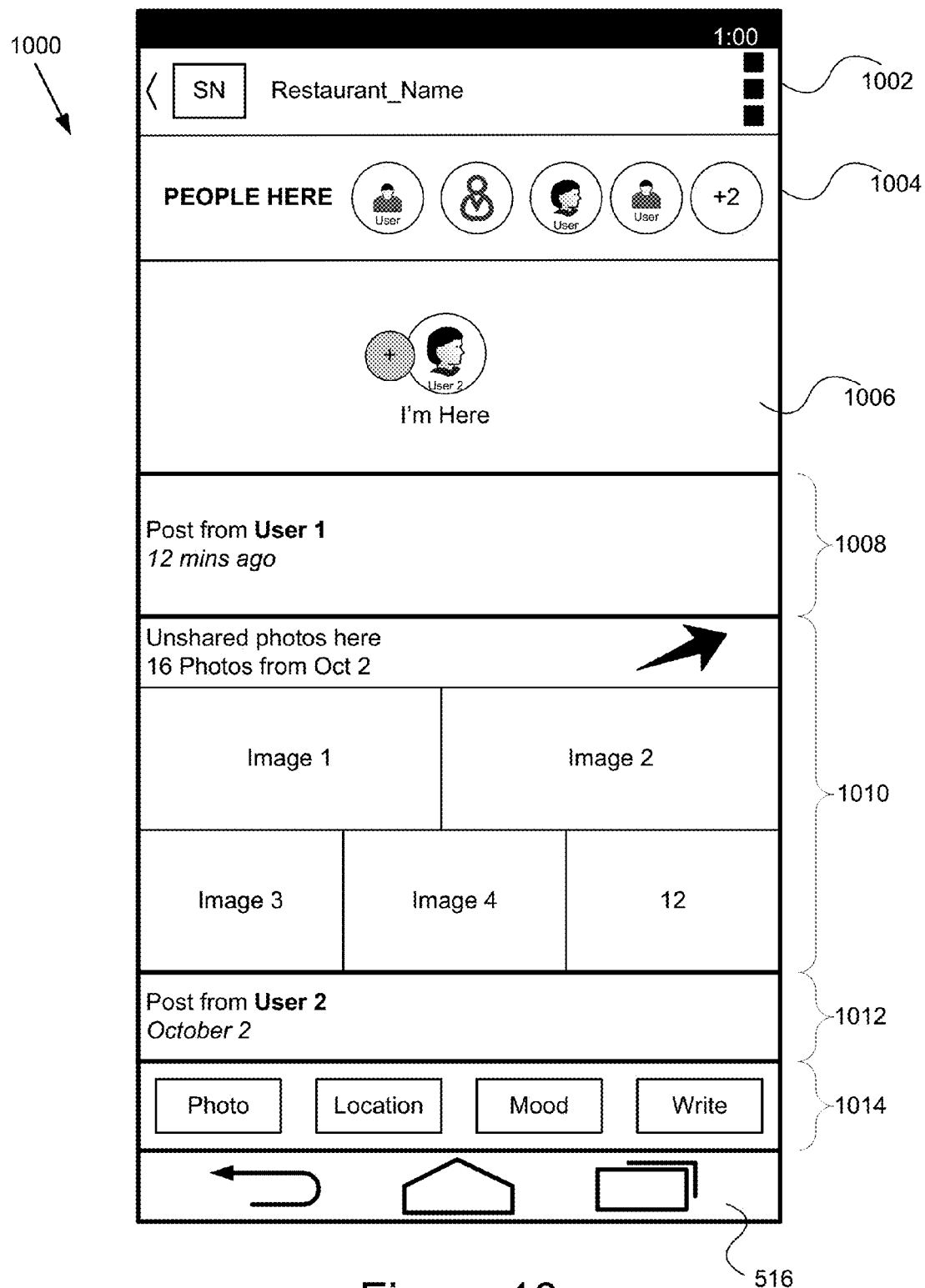
FIGS. 10-14 are graphic representations of example user interfaces for storing real world interactions based on location and presenting real world interactions based on location.

FIG. 10 is a graphical representation of a notification 1000 that is automatically generated based on the user (user 2) arriving at a place. In this example, user 2 arrives at a place called "Restaurant_Name" and the notification 1000 shown in FIG. 10 is generated and sent. The notification 1000 can be sent to user 2. In some implementations, the presence of the user at the place is automatically detected and this notification generated, and others can see a similar message indicating that the user 2 is at the place. In other implementations, the system generates the notification 1000 and the user must select the button in status section 1006 to confirm his or her presence at the place. After the user has confirmed his or her presence at a place, a similar notification can be sent to other users in the social graph of user 2 in accordance with user 2's preferences. The notification 1000 includes a header 1002 including an identification of the social network (SN), text describing the place ("Restaurant_Name") and a number of navigational icons. The notification 1000 also includes a "People Here" section 1004 indicating other users that are also at the same place. In some implementations, section 1004 includes the icon or image used by the other users in the social network indicating their presence at the place. As noted above, the users presented in section 1004 have been filtered and ranked to present the users with relationships and the strongest connections to the user 2. The People Here section 1004 includes a selectable icon for transitioning to the notification 1400 of FIG. 14 where additional information about the people at the place is provided. In a status section 1006, the notification 1000 provides feedback to the user that he or she is here and what is being published to others. When this same notification 1000 is sent to other users they can immediately identify from the status section 1006 who (in this example user 2) has just arrived at the place. The status section 1006 may also include a button that allows the user to manually check at a place. The notice 1000 also includes a number of sections for providing content related to the place. In this example, the content includes a post 1008 from user 1. Although not shown, the post 1008 may include an icon or image representing the poster, images, links, additional text, a time, an identification of the user, and other action buttons to endorse, reshare or comment on the post 1008. The notification 1000 also includes a section 1010 for unshared photos taken at the place. This section 1010 would typically only be displayed to the user 2. The section 1010 indicates a number of photos, the date the photos were taken, thumbnail images of selected photos and an action button to transition to a notification showing the photos that are not represented with thumbnails. The notification 1000 also includes data extracted from the place history of the user. For example, section 1012 shows another post from user 2 from prior visit on October 2. The post may include information like photos, links to the place on a map, and other information. Any number of activities of user 2 on prior visits can be extracted from the place history and provided as part of the notification 1000. An action or scribble section 1014 provides a number of selectable buttons for capturing information about the place, for example, taking photos, capturing location, including a mood, or writing notes. Finally, the notification 1000 includes a footer 516 as has been described above with reference to FIG. 5.

Referring now to FIG. 11, a consent notification 1100 sent to a user to obtain his or her consent to disclose his or her presence at a place is shown. In some implementations, the consent notification 1100 is presented over the arrival notification of FIG. 10 as depicted in FIG. 11. The consent notification 1100 includes an image 1102 representative of the place, an icon or image 1104 representing the user, in this example user 2, and an informational area 1106. The informational area 1106 provides text indicating that the user has been determined to be at a new place and requesting his or her consent to disclose his or her presence at that place to others. The informational area 1106 includes a status or tag line that the user can enter for his or her profile and that is shared with people who see him or her at a place and indicating that he or she has arrived at a place, for example, "User 2—Only here while supplies last." The informational area 1106 also includes an address caption 1116 where the group which will be able to see their presence can be modified and changed as the user desires. In this example, the informational area 1106 also includes a selectable box and associated text 1108 that allow the user to set a preference to make himself or herself visible in all places that fall within a similar category. More specifically, the selectable box 1108 allows the user to reveal his or her presence in all places that are cafés. Finally, the informational area 1106 includes selectable buttons 1112, 1110 to reject or consent, respectively.

Figure 12:
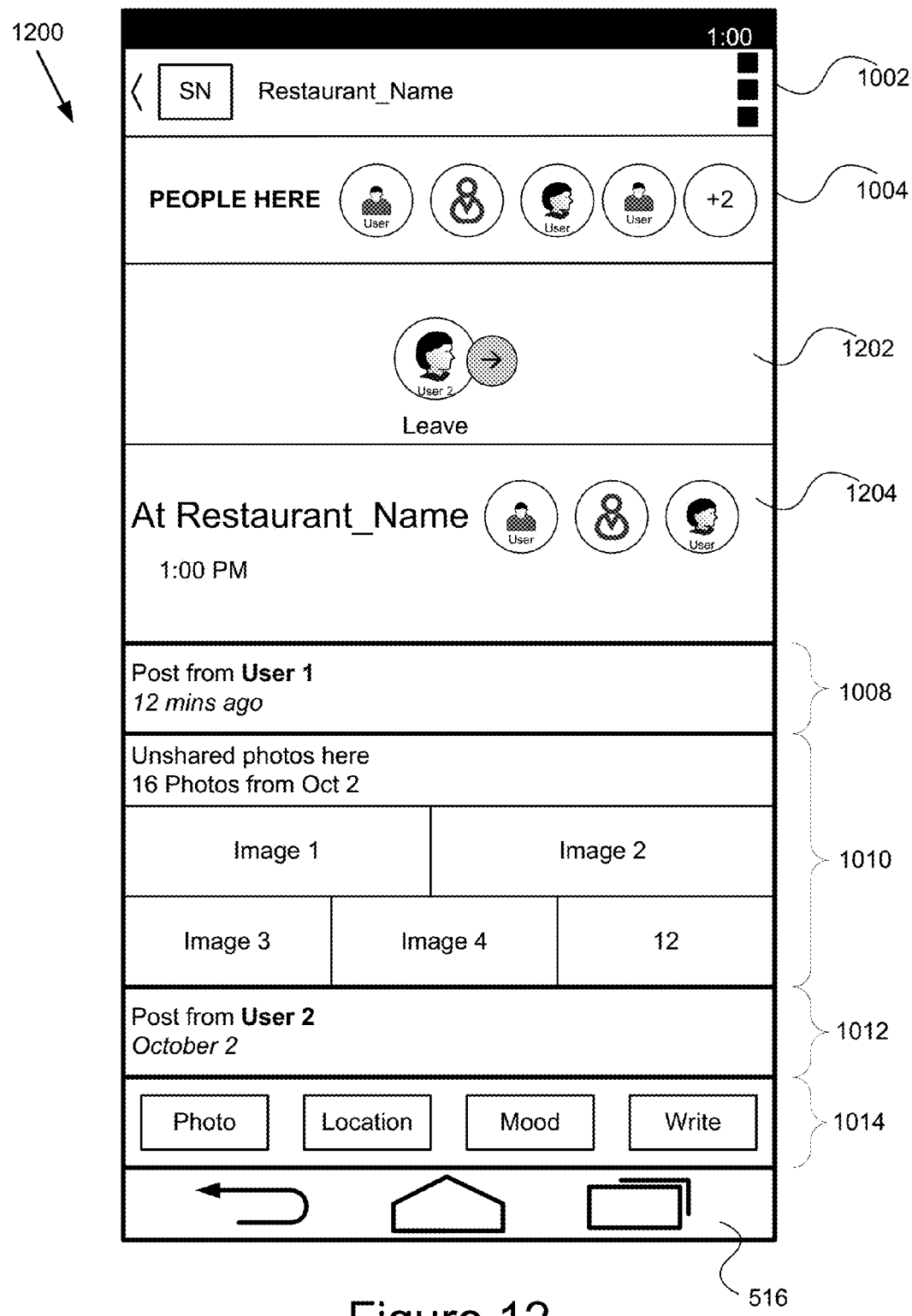

Referring now to FIG. 12, a notification 1200 that is presented and updated while the user is at a place is shown. The notification 1200 has many components with the same or similar functionality to the components of notification 1000 of FIG. 10 so that description will not be repeated here. For example, the notification 1200 includes a header 1002, the people here area 1004, posts 1008, 1012, a section 1010 for unshared photos and a footer 516 similar to corresponding components described above with reference to FIG. 10. The notification 1200 differs from the notification 1000 of FIG. 10 in a number of respects. First, the status area 1202 is modified to include a selectable button to indicate that the user is leaving the present location. Selection of this button may also cause the user to be checked out of a current location. Second, a place area 1204 provides text and other information about the place. The place area 1204 can also indicate other users that are at the place. It should be understood that the users in area 1204 are different from the users listed in the people here section 1004. The people here section 1004 includes people that are also nearby but not necessarily at the place.

Figure 13:
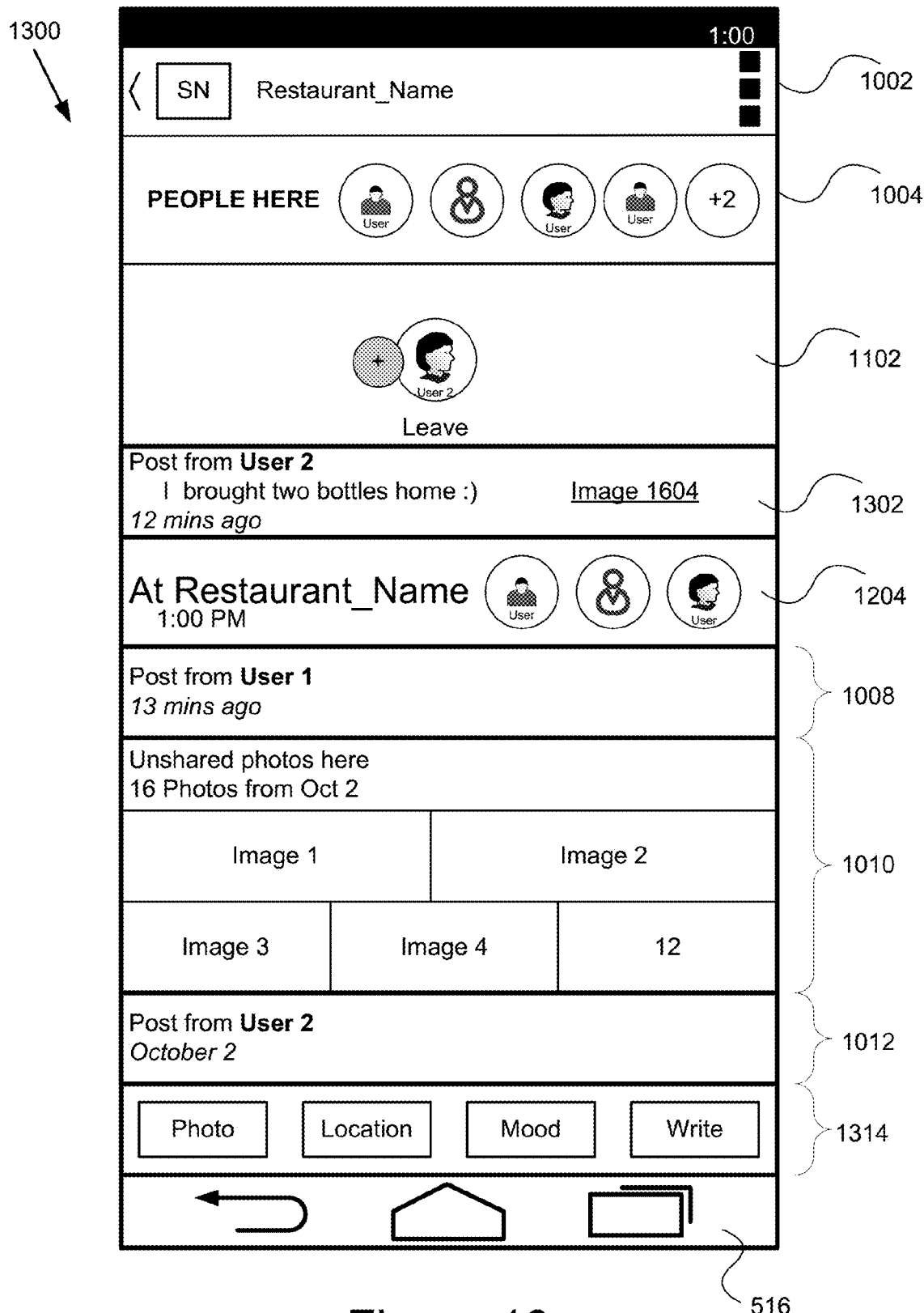

Referring now to FIG. 13, a notification 1300 that is presented and updated after the user has performed a social network action is shown. Again, the notification 1300 has many similar components with the same or similar functionality to the components of notifications 1000, 1200 of FIGS. 10 and 12 so that description will not be repeated here. In this example, the notification 1300 is updated to indicate that the user has sent a post with text and an image 1304 from the current place. The notification 1300 is very similar to the notification 1200 of FIG. 12 but has a post 1302 that has been retrieved by the social network interface module 1708 and added to the notification 1300. In this example, the user has posted a message 1302 indicating that she "bought two bottles of wine" at the place (e.g., Restaurant_Name) and with an image 1304 of the label of the wine bottle. Based on this example, it should be understood how the notification can be updated to indicate: any action that the user has taken at the place on a social network, any interaction the user has had at the place, any transaction that the user has performed at the place or any interaction with a third-party system or service while at the place.

Figure 14:
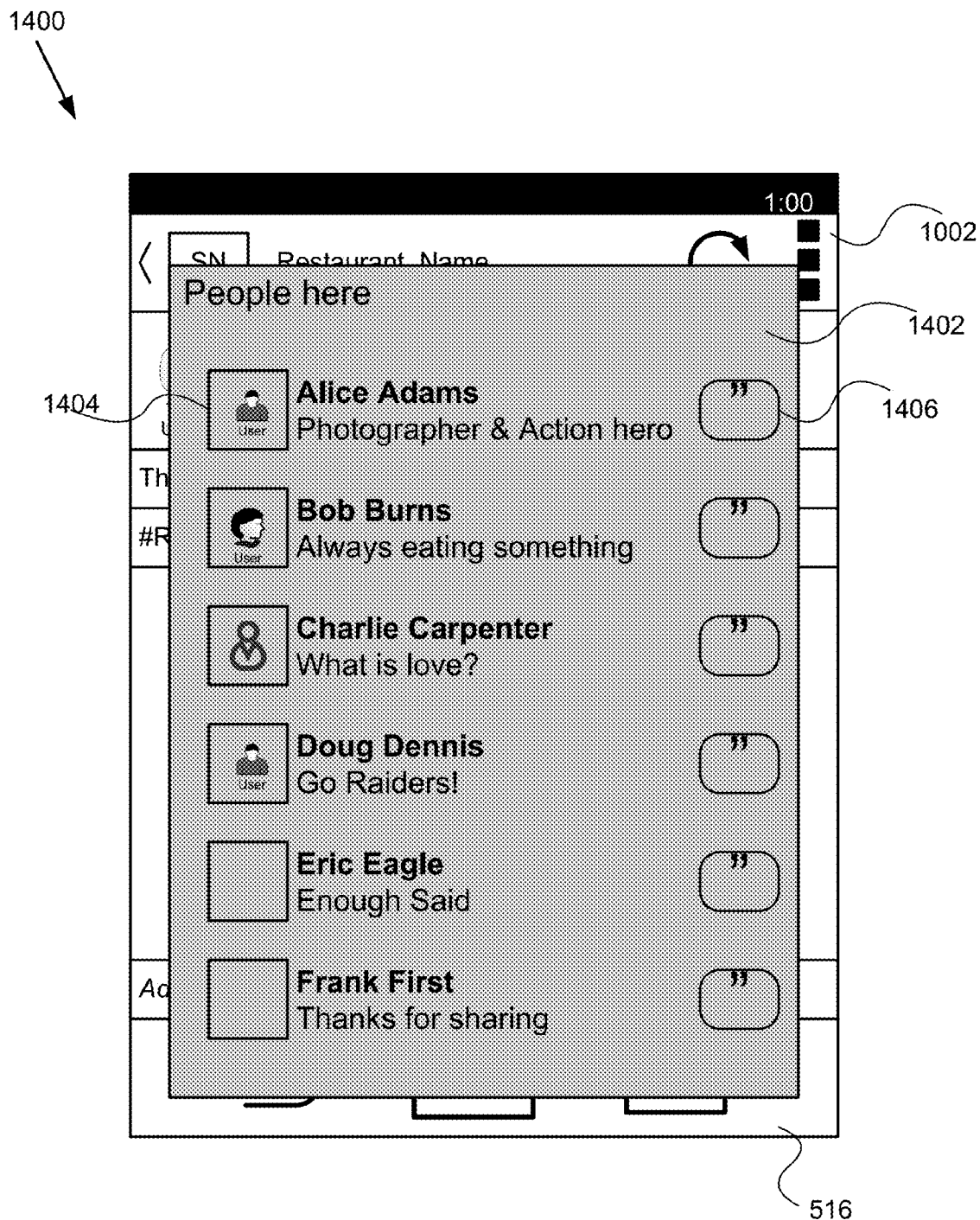

Referring now to FIG. 14, a notification 1400 that is presented if the user selects an icon in the "people here" section 1004 of any of the notifications 1000, 1200 and 1300 is shown. The notification 1400 provides a list 1402 of people who are near or at the place. The people are listed in rank order of their strength of relationship to the user. For each person on the list, his or her name as used in the social network, an icon or image used to represent him or her on the social network, and a caption from his or her profile 1404 are shown. Each listed user also has a link 1406 to transition to recent posts that have been made by that user. It should be understood that the notification 1400 in FIG. 14 is merely one example. The list of people, the criteria for ranking the people in the list and the information about each person could be modified in a variety of ways to include more or less information.

Figure 15:
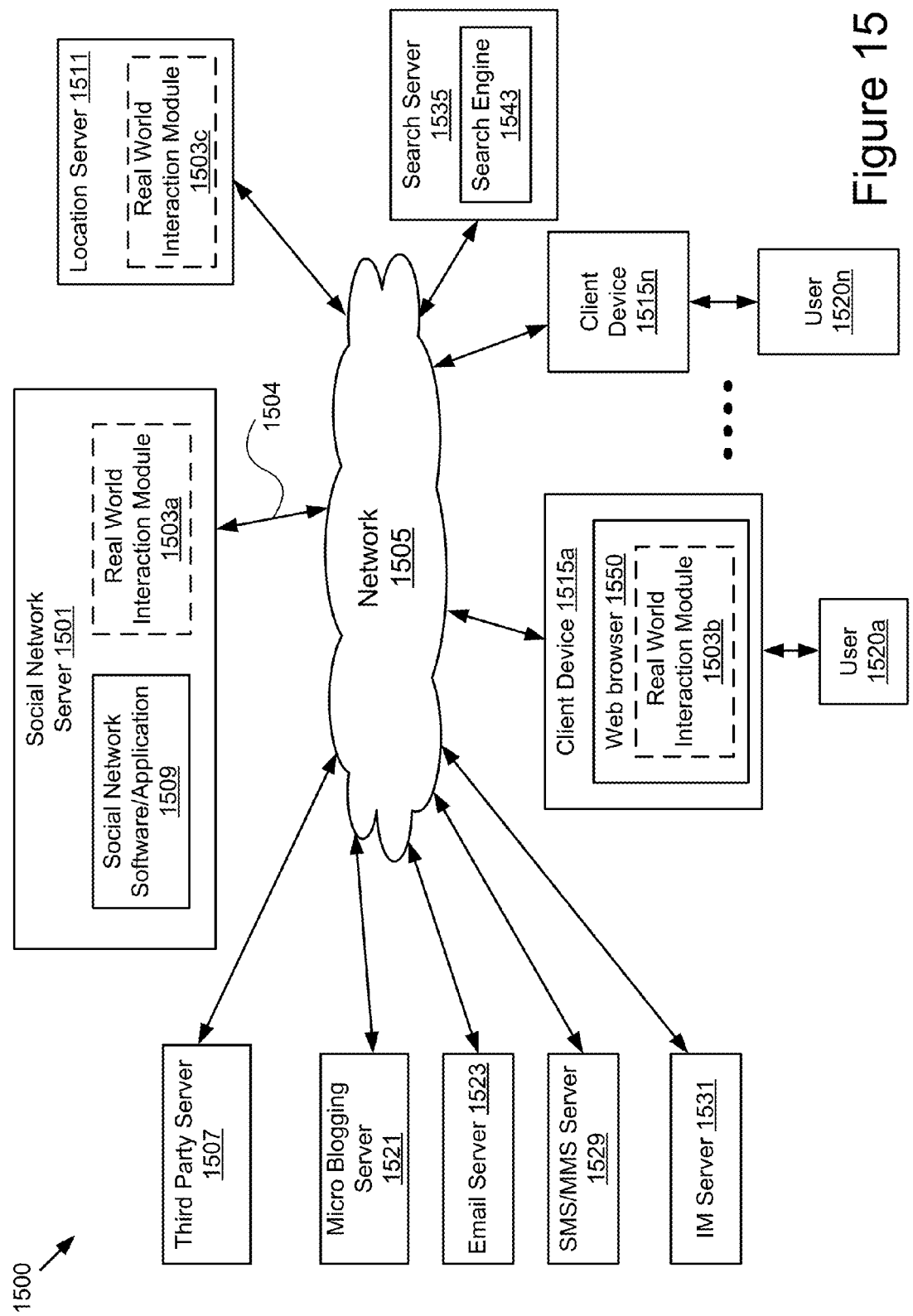
FIG. 15 is a high-level block diagram illustrating an example system for storing real world interactions based on location.

FIG. 15 illustrates a high-level block diagram of a system 1500 for storing real world interactions based on location according to some implementations of the present disclosure. The illustrated system 1500 includes client devices 1515a-1515n (also referred to herein individually and collectively as 1515) that are accessed by users 1520a-1520n (also referred to herein individually and collectively as 1520), a social network server 1501 having a social network application 1509 and a real world interaction module 1503a (also referred to herein individually and collectively as 1503). The system 1500 also includes a number of products or services offered by a third party server 1507, a location server 1511, a micro blogging server 1521, an email server 1523, a Short Message Service (SMS)/Multimedia Messaging Service (MMS) server 1529, an Instant Messaging (IM) server 1531, and a search server 1535. In the illustrated implementation, these entities are communicatively coupled via a network 1505. These systems 1501, 1507, 1511, 1521, 1523, 1529, 1531, and 1535 are merely examples and the system 1500 in some implementations includes an advertisement server, a document server, a blogging server, a news feed server, a video sharing server, a photo sharing server, a map server, and any other third party server, etc. The search server 1535 may include a search engine 1543.

The client devices 1515*a*-1515*n* in FIG. 15 are used by way of example. While FIG. 15 illustrates two client devices 1515*a* and 1515*n*, the present disclosure applies to any system architecture having one or more client devices 1515. Furthermore, while only one network 1505 is coupled to the client devices 1515*a*-1515*n*, the social network server 1501, the third party server 1507, the location server 1511, the micro blogging server 1521, the email server 1523, the Short Message Service (SMS)/Multimedia Messaging Service (MMS) server 1529, the Instant Messaging (IM) server 1531, and the search server 1535, in practice one or more networks 1505 can be connected to these entities. Furthermore, while only one the third party server 1507 is shown, the system 1500 can include one or more the third party servers 1507. Furthermore, while only one social network server 1501 is shown, the system 1500 can include one or more social network servers 1501.

While shown as operational on the social network server 1501 in FIG. 15, in some implementations all or part of the real world interaction module 1503*a*, 1503*b*, 1503*c* may be operational on the one or more of the client devices 1515, the third party server 1507 or the location server. The real world interaction module 1503 interacts with the servers 1501, 1507 and 1511, via the network 1505. The real world interaction module 1503 is also coupled for communication with the client device 1515*a*, which is connected to the network 1505 via signal line 15. The user 1520*a* interacts with the client device 1515*a*. Similarly, the client device 1515*n* is coupled to the network 1505 via signal line 15 and the user 1520*n* interacts with the client device 1515*n*. The user 1520 is a human user of the client device 1515. It should be recognized that the real world interaction module 1503 can be stored in any combination of the devices and servers, or in only one of the devices or servers. The real world interaction module 1503 will be described in more detail with reference to FIGS. 16-17, 1-4 and 6-9.

The social network server 1501 is coupled to the network 1505 via signal line 15 for communication and cooperation with the other components of the system 1500. In some implementations, the social network server 1501 includes the social network software/application 1509. Although only one social network server 1501 is shown, it should be recognized that multiple servers may be present. A social network may be any type of social structure where the users 1520 are connected by a common feature. The common feature includes relationships/connections, e.g., friendship, family, work, an interest, etc. The common features are provided by one or more social networking systems, for example, those included in the system 1500, including explicitly-defined relationships and relationships implied by social connections with other online users, where the relationships form a social graph. In some examples, the social graph can reflect a mapping of these users and how they are related. The phrase social graph as used herein encompasses its plain and ordinary meaning including, but not limited to, a file that includes the relationships between the users in a social network. For example, users can be friends, acquaintances, have business relationships, one user can follow another user, one user can subscribe to another user, share with other users or a specific user, etc. Furthermore, it should be understood that the social network server 1501 and the social network software/application 1509 are representative of one social network and that there may be multiple social networks coupled to the network 1505, each having its own server, application and social graph. For example, a first social network may be more directed to business networking, a second may be more directed to or centered on academics, a third may be more directed to local business, a fourth may be directed to dating and others of general interest or a specific focus.

In some implementations, the social network server 1501 receives and sends data and social information provided by the other servers 1507, 1511, 1521, 1523, 1529, 1531, and 1535. For example, the social network server 1501 receives and sends any social information or events performed on any web pages and/or applications hosted by the servers 1507, 1511, 1521, 1523, 1529, 1531, and 1535. The web pages and/or applications include a user interface allowing a user 1520 to respond to, comment, or endorse a product, a video, a search result, a widget, a post, a comment, a photo, an article, etc., shown on the web pages and/or applications.

In some implementations, the social network server 1501, the third party server 1507, location server 1511, the Micro Blogging server 1521, the email server 1523, the SMS/MMS server 1529, the IM server 1531, and the search server 1535 are hardware servers including a processor, a memory, and network communication capabilities.

The location server 1511 is coupled to the network 1505 via signal line 15 for communication and cooperation with the other components of the system 1500. The location server 1511 is coupled to receive location information from the client devices 1515. The location server 1511 can receive updates from the client devices 1515 as to their location and maintains a log or database of location information. The location server 1511 may use a variety of different communication protocols to determine location including but not limited to global positioning systems (GPS), Wi-Fi, GSM localization, cellular triangulation, near field communication technologies, Bluetooth®, infrared, etc. The location server 1511 can receive periodic reports or updates from the client devices 1515 as to location. In some implementations, the location server 1511 can poll client devices 1515 for the location. In some implementations, the client devices 1515 may update the location server 1511 anytime location has changed. In the illustrated implementation, the location server 1511 includes a real world interaction module 1503*c*.

The client devices 1515 can be any computing devices including one or more memory and one or more processors, for example, a laptop computer, a desktop computer, a tablet computer, a mobile telephone, a personal digital assistant (PDA), a mobile email device, a portable game player, a portable music player, a television with one or more processors embedded therein or coupled thereto, or any other electronic device capable of accessing a network. In some implementations, the system 1500 includes a combination of different types of client devices 1515, for example, a combination of a personal computer and a mobile phone. As will be described below, it should be understood that the present technologies can operate on different models other than a client-server architecture. For example, the client devices 1515 may include the real world interaction module 1503 and include different services. The client device 1515 will be described in more detail with reference to FIG. 16.

The browser 1550 can be a web browser stored on the client device 1515 and configured for two-way communications with the servers 1501, 1507, 1511, 1521, 1523, 1529, 1531, and 1535. For example, the browser 1550 is a software application for retrieving, presenting and traversing information resources on the web. In the illustrated implementation, the browser 1550 includes a real world interaction module 1503*b*.

The network 1505 enables communications between the client devices 1515*a-n*, the social network server 1501, the third party server 1507, the location server 1511, the Micro Blogging server 1521, the email server 1523, the SMS/MMS server 1529, the IM server 1531, and the search server 1535. Thus, the network 1505 can include links using technologies including, for example, Wi-Fi, Wi-Max, 2G, Universal Mobile Telecommunications System (UMTS), 3G, Ethernet, 802.11, integrated services digital network (ISDN), digital subscriber line (DSL), asynchronous transfer mode (ATM), InfiniBand, PCI Express Advanced Switching, etc. Similarly, the networking protocols used on the network 1505 can include the transmission control protocol/Internet protocol (TCP/IP), multi-protocol label switching (MPLS), the User Datagram Protocol (UDP), the hypertext transport protocol (HTTP), the simple mail transfer protocol (SMTP), the file transfer protocol (FTP), lightweight directory access protocol (LDAP), Code Division Multiple Access (CDMA), Wideband Code Division Multiple Access (WCDMA), Global System for Mobile communications (GSM), High-Speed Downlink Packet Access (HSDPA), etc. The data exchanged over the network 1505 can be represented using technologies and/or formats including the hypertext markup language (HTML), the extensible markup language (XML), etc. In addition, all or some of links can be encrypted using conventional encryption technologies, for example, the secure sockets layer (SSL), Secure HTTP and/or virtual private networks (VPNs), or Internet Protocol security (IPsec). In some implementations, the entities can use custom and/or dedicated data communications technologies instead of, or in addition to, the ones described above. Depending upon the implementation, the network 1505 can also include links to other networks.

In some implementations, the network 1505 is a partially public or a wholly public network, for example, the Internet. The network 1505 can also be a private network or include one or more distinct or logical private networks (e.g., virtual private networks, Wide Area Networks ("WAN") and/or Local Area Networks ("LAN")). Additionally, the communication links to and from the network 1505 can be wired or wireless (i.e., terrestrial or satellite-based transceivers). In some implementations, the network 1505 is an IP-based wide or metropolitan area network.

The network 1505 may have any number of configurations including a star configuration, token ring configuration or other configurations. Furthermore, the network 1505 may include a local area network (LAN), a wide area network (WAN) (e.g., the Internet), and/or any other interconnected data path across which multiple devices may communicate. In some implementations, the network 1505 may be a peer-to-peer network. The network 1505 may also be coupled to or include portions of a telecommunications network for sending data in a variety of different communication protocols. In some implementations, the network 1505 includes short-wavelength communication networks or a cellular communications network for sending and receiving data including via short messaging service (SMS), multimedia messaging service (MMS), hypertext transfer protocol (HTTP), direct data connection, wireless application protocol (WAP), electronic messages, etc.

Figure 16:
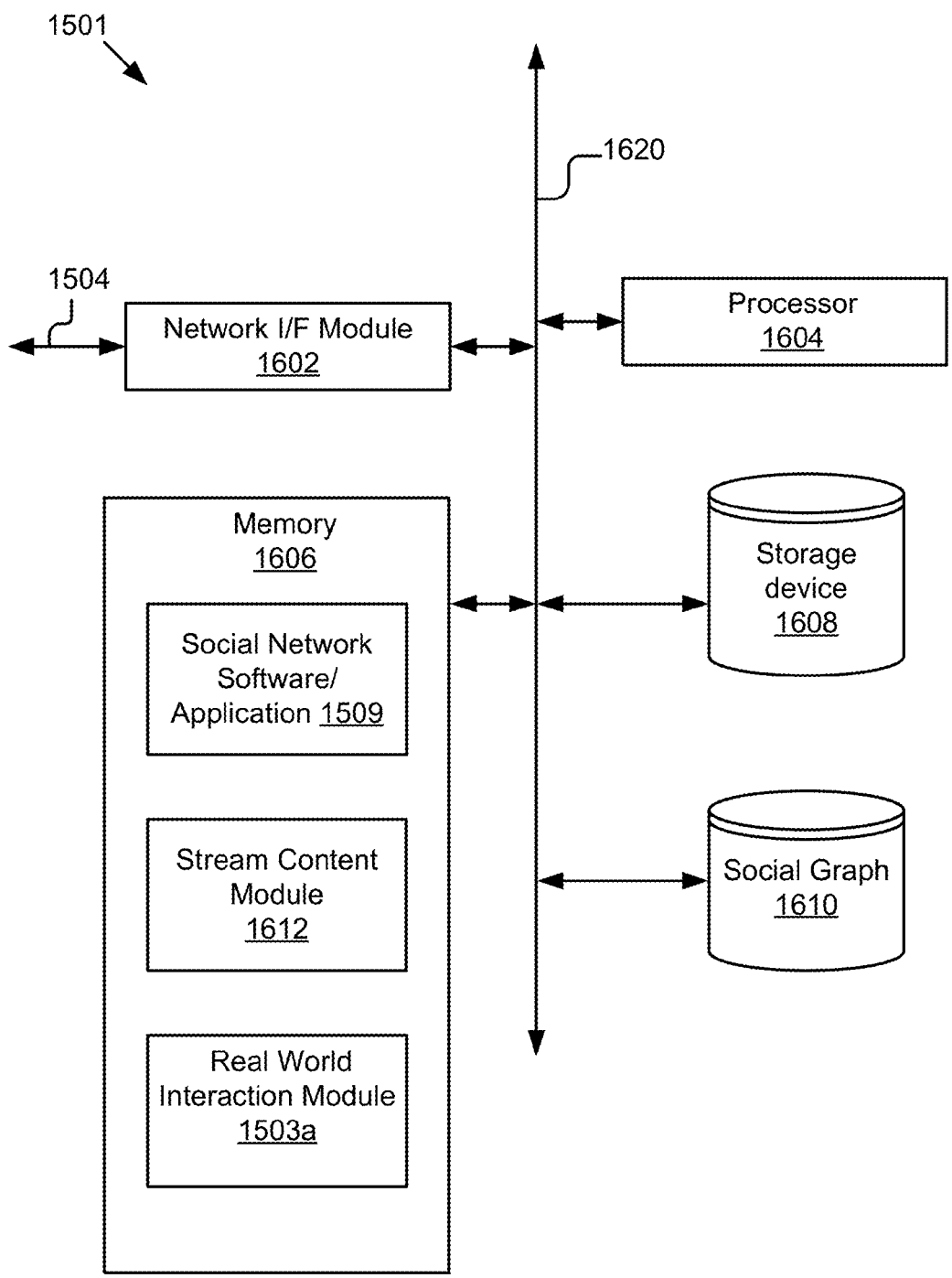
FIG. 16 is a block diagram illustrating an example social network server including a real world interaction module.

FIG. 16 illustrates the social network server 1501 according to some implementations of the present disclosure. In the illustrated implementations, the social network server 1501 includes the network interface (I/F) module 1602, a processor 1604, a memory 1606, a storage device 1608, and a social graph 1610. These components of the social network server 1501 are communicatively coupled to a bus or software communication mechanism 1620 for communication with each other.

The network interface module 1602 is coupled to the network 1505 by signal line 15. The network interface module 1602 is also coupled to the bus 1620. The network interface module 1602 includes ports for wired connectivity including but not limited to USB, SD, or CAT-5, etc. The network interface module 1602 links the processor 1604 to the network 1505 that may in turn be coupled to other processing systems. The network interface module 1602 provides other conventional connections to the network 1505 using standard network protocols, e.g., TCP/IP, HTTP, HTTPS, and SMTP. In some implementations, the network interface module 1602 includes a transceiver for sending and receiving signals using WiFi, Bluetooth® or cellular communications for wireless communication.

The processor 1604 may include an arithmetic logic unit, a microprocessor, a general purpose controller, or some other processor array to perform computations and provide electronic display signals to a display device. In some implementations, the processor 1604 is a hardware processor. The processor 1604 is coupled to the bus 1620 for communication with the other components. Processor 1604 processes data signals and may include various computing architectures including a complex instruction set computer (CISC) architecture, a reduced instruction set computer (RISC) architecture, or an architecture implementing a combination of instruction sets. Although only a single processor is shown in FIG. 16, multiple processors may be included. It should be understood that other processors, operating systems, sensors, displays, and physical configurations are possible.

The memory 1606 stores instructions and/or data that may be executed by the processor 1604. In the illustrated implementation, the memory 1606 stores the social network software/application 1509, the stream content module 1612 and the real world interaction module 1503*a*. The memory 1606 is coupled to the bus 1620 for communication with the other components of the social network server 1501. The instructions and/or data may include code for performing any and/or all of the techniques described herein. The memory 1606 may be a dynamic random access memory (DRAM) device, a static random access memory (SRAM) device, flash memory, or some other memory devices.

The storage device 1608 may be a non-transitory memory that stores data. For example, the storage device 1608 may be a dynamic random access memory (DRAM) device, a static random access memory (SRAM) device, flash memory, or some other memory device. In some implementations, the storage device 1608 also includes a non-volatile memory or similar permanent storage device and media, for example, a hard disk drive, a floppy disk drive, a compact disc read only memory (CD-ROM) device, a digital versatile disc read only memory (DVD-ROM) device, a digital versatile disc random access memories (DVD-RAM) device, a digital versatile disc rewritable (DVD-RW) device, a flash memory device, or some other non-volatile storage device. In some implementations, the storage device 1608 stores data received from and sent to users 1520 to accomplish the functionalities described herein of the real world interaction module 1503a.

Software communication mechanism 1620 may be an object bus (e.g., CORBA), direct socket communication (e.g., TCP/IP sockets) among software modules, remote procedure calls, UDP broadcasts and receipts, HTTP connections, function or procedure calls, etc. Further, any or all of the communication could be secure (SSH, HTTPS, etc.). The software communication mechanism 1620 can be implemented on any underlying hardware, for example, a network, the Internet, a bus, a combination thereof, etc.

The stream content module 1612 can be software or routines for generating a stream of content tailored or particular to the user. In FIG. 16, the stream content module 1612 is shown as a module operational part of memory 1606. In some implementations, the stream content module 1612 may be part of the social network application 1509. The social network application 1509 may cooperate with the social network application 1509 to generate and provide the stream of content. Based upon the user's interests, social graph, interactions, and other factors, the stream content module 222, may generate a stream of content tailored to the user. The stream content module 1612 may be software including routines for generating and providing the stream of content. In some implementations, the stream content module 1612 may be a set of instructions executable by the processor 1604 to provide the functionality described herein for generating and providing the stream of content. In some implementations, the stream content module 1612 may be stored in the memory 1606 of the server 1501 and is accessible and executable by the processor 1604. In some implementations, the stream content module 1612 may be adapted for cooperation and communication with the processor 1604 and other components of the server 1501 via bus 1620.

The real world interaction module 1503 is configured to perform a number of functions including: storing real world interactions based on location, creating a user preference model from interactions based on location, automated performance of an interaction (e.g., an action on the social network or a transaction with the third-party system) based on location, and creating and storing a real world identity. The real world interaction module 1503 includes a number of components as will be described in more detail below with reference to FIG. 17. These components cooperate to provide the functions described above and described in more detail with reference to FIGS. 6-9. The real world interaction module 1503 also generates a variety of notifications or user interfaces for interacting with the user. Examples of such notifications or user interfaces generated by the real world interaction module 1503 are shown in FIGS. 10-14.

The real world interaction module 1503 also generates notifications for presentation based on location, relationships and identity. In some implementations, the real world interaction module 1503 also uses real world context to determine which notifications to generate and present. The real world interaction module 1503 receives and processes the signals from the location server 1511 or the client device 1515 to retrieve location information. The real world interaction module 1503 receives and processes the signals from the social network application 1509 to retrieve relationship information including relationships with other people, relationships with things, interests and other information. The real world interaction module 1503 also receives and processes the signals from the social network application 1509 to retrieve credential and authorization information. In some implementations, the real world interaction module 1503 can receive and process signals from other sources, for example a profile server, to retrieve credential and authorization information. The real world interaction module 1503 processes the information from these resources to surface, generate and provide notifications based on location. In some implementations, the real world interaction module 1503 determines an identification (ID) to automatically and intelligently connect the user to places/locations and what the user can do at that place/location. The real world interaction module 1503 may also automatically detect where the user is and tell the user what she can do (post pictures, comments, notify others to some, broadcast your location to public, pay your bill, comment on post about location, other functions related to location (e.g., hotel check in, restaurant check in, etc.). In some implementations, the real world interaction module 1503 connects people to places by using an identity or identification to offer up available services (e.g., payments, etc.) and social opportunities (e.g., backchannel conversations, 1-1 notes) at the real world places that users visit. The real world interaction module 1503 may create and maintains a private and shared history with the places with which people visit and transact. The operation of the real world interaction module 1503 will be described in more detail with reference to FIGS. 1-4 and 6-9. In some implementations, the real world interaction module 1503 may interact with the third party server 1507, the location server 1511, the Micro Blogging server 1521, the email server 1523, the SMS/MMS server, the IM server 1531, the search server 1535, and any other entities (not pictured) for executing transactions that can be included in the system 1500. In some implementations, the notifications surfacing module 1503 may be an application that can be activated or installed on the mobile device of the user.

Figure 17:
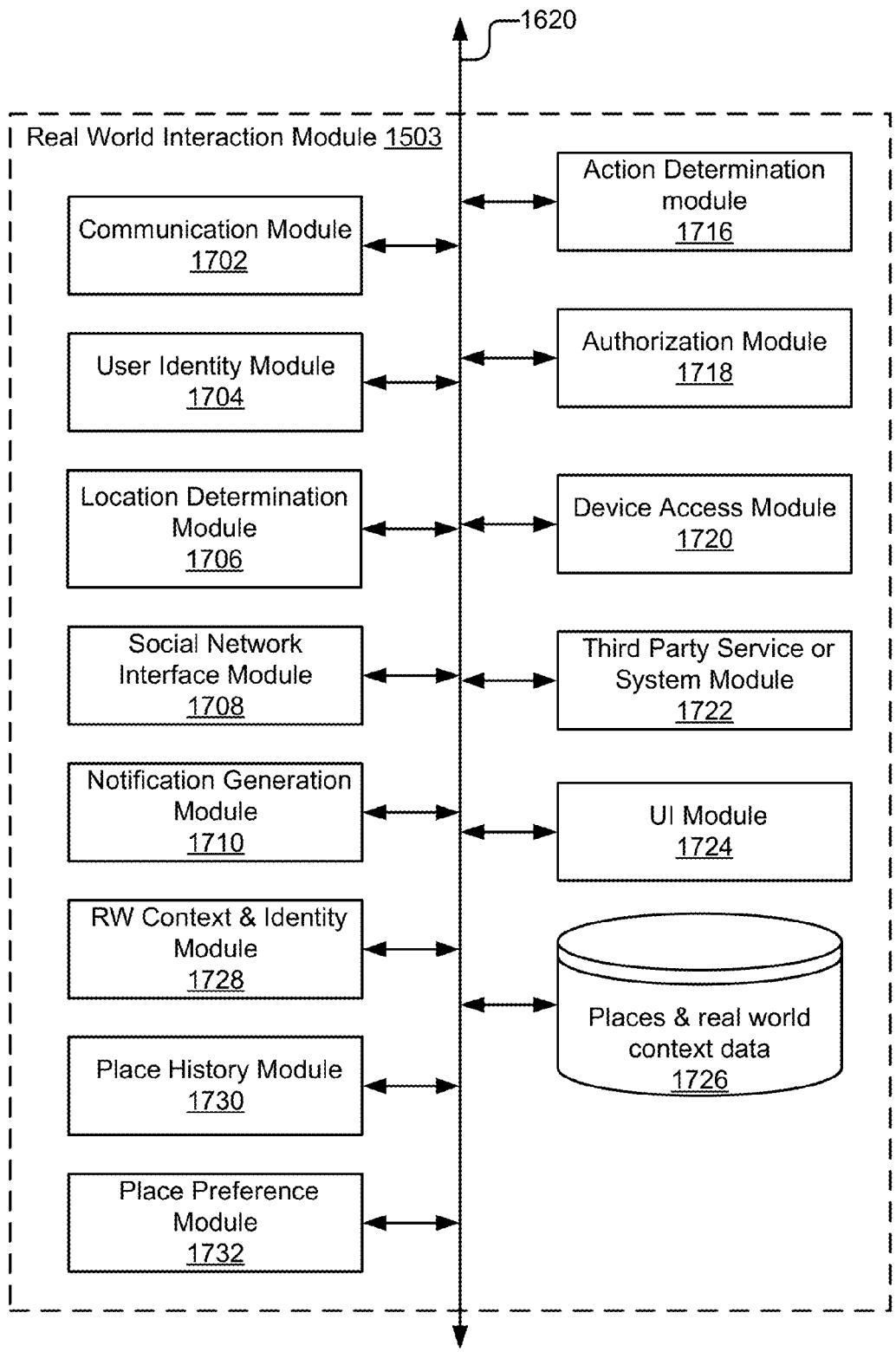
FIG. 17 is a block diagram illustrating an example real world interaction module stored on the social network server.

Referring now to FIG. 17, the real world interaction module 1503a is described in more detail according to some implementations. The real world interaction module 1503a includes a communication module 1702, a user identity module 1704, a location determination module 1706, a social network interface module 1708, a notification generation module 1710, an action determination module 1716, an authorization module 1718, a device access module 1720, a third-party service or system module 1722, a user interface module 1724, a places and real world context data storage 1726, a real world context and identity module 1728, a place history module 1730, and a place preference module 1732.

The communication module 1702 can be software or routines for handling communications between the user identity module 1704, the location determination module 1706, the social network interface module 1708, the notification generation module 1710, the action determination module 1716, the authorization module 1718, the device access module 1720, the third-party service or system module 1722, the user interface module 1724, the places and real world context data storage 1726, and the real world context and identity module 1728. The communication module 1702 also facilitates communication with the other components of the social network server 1501 as well as communication with the other components of the system 1500 via the network interface module 1602 and the network 1505. For example, the communication module 1702 may send signals between servers and the components of the real world interaction module 1503. In some implementations, the communication module 1702 is a set of instructions executable by the processor 1604. In some implementations, the communication module 1702 is stored in the memory 1606 of the social network server 1501 and is accessible and executable by the processor 1604. In some implementations, the communication module 1702 is adapted for cooperation and communication with the processor 1604, the memory 1606, and other components of the real world interaction module 1503 via the bus 1620.

The user identity module 1704 can be software or routines for determining an identification (ID) for a user. In some implementations, the identification is associated with a portable device and may include a user name and password. For example, the identification may be the username and password corresponding to a user to access the social network application 1509 for retrieval of social information of the user. In some implementations, the identification is the username and password used for a profile server. The profile server (not pictured) in turn may include other usernames and passwords for other systems and devices. The user identity module 1704 includes routines for accessing identity information so that the other components of the real world interaction module 1503 can retrieve other information (e.g., location, access to services, access to devices, interests, relationships, or social graphs, etc.) from other systems. In some implementations, the real world interaction module 1503 connects users to places and services via authentication using a single identity based on the things they choose to do at a place/establishment. In general, the user can present his or her identity to a place (business or establishment) and use that single identity for different actions, services and transactions at that place. That same single identity can be used on an incremental basis on a single visit or over the course of multiple visits to authorize additional or different actions, services and transactions. For example, a user might initially only share his or her presence at the place. The user could then incrementally authorize sharing more information (e.g., preferences for food at a restaurant). Finally, the user could incrementally add an auto payment authorization. If a user decides to enable co-presence whenever he visits a place, he inputs his consent or authorization via an "I'm Here" consent dialogue. Should a user decide to use a service when he visits a place/establishment (e.g., pay via a mobile payment system), he will input his consent or authorization via a consent for automatic payment notification. In some implementations, the user identity module 1704 will notify the third-party service or system module 1722 of co-presence so that co-presence related services may be identified in initiated. For example, a particular offer at a particular establishment may require four (4) users be present in order for the offer to be valid. The user identity module 1704 can determine whether a particular user has co-presence with the requisite number of other users that are also present at the location and therefore, eligible for special services that are related to co-presence. In some implementations, the user identity module 1704 is a set of instructions executable by the processor 1604. In some implementations, the user identity module 1704 is stored in the memory 1606 of the social network server 1501 and is accessible and executable by the processor 1604. In some implementations, the user identity module 1704 is adapted for cooperation and communication with the processor 1604, the memory 1606 and other components of the real world interaction module 1503a via the bus 1620.

The location determination module 1706 can be software or routines for determining a location of the user. In some implementations, the location determination module 1706 is coupled to receive location update signals from the client device 1515 or the location server 1511. The location determination module 1706 can access the places and real world context data 1726 to identify a place associated with the location (e.g., perform place detection). In some implementations, the real world interaction module 1503 knows the places (as opposed to location) a user visits, beyond just latitude and longitude. The real world interaction module 1503 using the location determination module 1706 taps into a database of the user's location history, a database of place metadata, and other place databases to determine the place metadata for the establishment where the place is at (e.g., place name, place type). The location determination module 1706 may also associate the place with the user and the location, and store a time, place and user ID in a place history for the user or their ID. In some implementations, the location determination module 1706 polls or requests location information from the client device 1515 or the location server for a particular ID. The location determination module 1706 may provide location information to the other components of the real world interaction module 1503. In some implementations, once the user has consented, the location determination module 1706 can provide real-time location information corresponding to an identification. This real-time information about location can be provided to the notification generation module 1710 and used to determine which notifications, if any, should be generated and sent to the user. In some implementations, once the user has consented, the location determination module 1706 can determine when a user arrives at a place and when he or she departs from a place. Arrival and departure is used in various ways to enhance a person's experience to record visits into a person's place history stream, enhance co-presence while at a place, and give vendors better signals to serve people visiting their establishments. In some implementations, the location determination module 1706 is a set of instructions executable by the processor 1604. In some implementations, the location determination module 1706 is stored in the memory 1606 of the social network server 1501 and is accessible and executable by the processor 1604. In some implementations, the location determination module 1706 is adapted for cooperation and communication with the processor 1604, the memory 1606 and other components of the real world interaction module 1503a via the bus 1620.

The social network interface module 1708 can be software or routines for retrieving relationship information using the identification for the user. The social network interface module 1708 is coupled to receive identity information from the user identity module 1704. Using the identity information, the social network interface module 1708 can retrieve relationship information from the social network application 1509. Location information or a place from the location determination module 1706 can also be used to retrieve information from the social network 1509. The social network interface module 1708 can also retrieve social information (e.g., posts, shares, re-shares, endorsements, interests, topics of social network activities, people interacting with on the social network, relationships, or social graphs, etc.). This relationship information or social information can be used to filter, rank or determine the context and content for generating notifications. In some implementations, the social network interface module 1708 is a set of instructions executable by the processor 1604. In some implementations, the social network interface module 1708 is stored in the memory 1606 of the social network server 1501 and is accessible and executable by the processor 1604. In some implementations, the social network interface module 1708 is adapted for cooperation and communication with the processor 1604, the memory 1606 and other components of the real world interaction module 1503a via the bus 1620. In such a manner, the social network interface module 1708 can provide relationship information or social information to the other components of the notification sharing module 1503.

The notification generation module 1710 can be software or routines for generating a notification related to the location of the user. The notification may include notification information and/or one or more user interface elements. Example notifications are described in more detail with reference to FIGS. 5A-5D. The location or place information is received by the notification generation module 1710 from the location determination module 1706. The identification information is received by the notification generation module 1710 from the user identity module 1704. The notification generation module 1710 may retrieve a first set of information related to the location information and identification information. The notification generation module 1710 may then filter or rank the first set of information using the relationship information received from the social network interface module 1708 to produce notification information. In some implementations, the top ranked information is selected for inclusion as part of the notification. The notification generation module 1710 may then provide the notification to the user. In some implementations, the notification generation module 1710 generates the notification using the notification information and user interface elements from the user interface module 1724. In some implementations, the notification information can include one or more actions that the user can perform at the particular location. The actions are provided by the action determination module 1716 to the notification generation module 1710. The notification generation module 1710 pushes the appropriate notification at the right time to users. General example notifications include: arrival detection, viewing a post, viewing places nearby, viewing photos of nearby places, performing an action on a social network, interacting with a device, determining people nearby, interesting places nearby, performing a transaction, updating a profile, history with a place, past actions at a place, authorizations set for a place, providing authorization, or providing consent. In some implementations, the notification generation module 1710 is a set of instructions executable by the processor 1604. In some implementations, the notification generation module 1710 is stored in the memory 1606 of the social network server 1501 and is accessible and executable by the processor 1604. In some implementations, the notification generation module 1710 is adapted for cooperation and communication with the processor 1604, the memory 1606 and other components of the real world interaction module 1503*a* via the bus 1620.

The action determination module 1716 can be software or routines for determining an action performable by the user. The action determination module 1716 is coupled to receive the location, the identity and information from other modules and determine what actions are available to be performed for the given location and user. The action determination module 1716 is also coupled to the other components to determine devices or third party systems upon which action can be taken. For example, actions include: viewing a post, viewing places nearby, performing an action on a social network, interacting with a device, determining people nearby, performing a transaction, updating a profile, providing authorization, or providing consent. In some implementations, the action determination module 1716 provides one or more action and a link to perform the actions to the notification generation module 1710 for incorporation into the notification. In some implementations, the action determination module 1716 is a set of instructions executable by the processor 1604. In some implementations, the action determination module 1716 is stored in the memory 1606 of the social network server 1501 and is accessible and executable by the processor 1604. In some implementations, the action determination module 1716 is adapted for cooperation and communication with the processor 1604, the memory 1606 and other components of the real world interaction module 1503*a* via the bus 1620.

The authorization module 1718 can be software or routines for retrieving authentication or credential information. The authorization module 1718 can provide the authentication or credential information to the other components of the real world interaction module 1503 for use in performing their functions. For example, the authentication or credential information may be provided for inclusion in the notification so that particular actions may be taken using the notification itself. In some implementations, the authorization module 1718 cooperates with the social network interface module 1708 to retrieve authentication or credential information from the social network application 1509. The authentication or credential information may be used by the notification generation module 1710 to filter data from the first set of information. In some implementations, the authorization module 1718 retrieves the authentication or credential information from the third-party systems, third party services, or devices themselves. In some implementations, the authorization module 1718 allows a user to operate in incognito mode. In such a mode, the location of the user is not displayed and not provided or made visible to other users. However, the user while in incognito mode can see the locations of other users as well as receive notifications related to their location. In some implementations, the authorization module 1718 is a set of instructions executable by the processor 1604. In some implementations, the authorization module 1718 is stored in the memory 1606 of the social network server 1501 and is accessible and executable by the processor 1604. In some implementations, the authorization module 1718 is adapted for cooperation and communication with the processor 1604, the memory 1606 and other components of the real world interaction module 1503*a* via the bus 1620.

The device access module 1720 can be software or routines for determining one or more devices proximate a location. More specifically, the device access module 1720 identifies any devices near a location that are capable of being controlled based on the user's identification. The device access module 1720 is coupled to receive the location, the identity and information from other modules and determine what devices are available to control for the given location and user. The device access module 1720 provides communication protocols for communication with the devices and their associated systems. In some implementations, the device access module 1720 provides a link to perform the action on an identified device to the notification generation module 1710 for incorporation into the notification. In some implementations, the device access module 1720 is a set of instructions executable by the processor 1604. In some implementations, the device access module 1720 is stored in the memory 1606 of the social network server 1501 and is accessible and executable by the processor 1604. In some implementations, the device access module 1720 is adapted for cooperation and communication with the processor 1604, the memory 1606 and other components of the real world interaction module 1503*a* via the bus 1620.

The third-party service or system module 1722 can be software or routines for determining a third-party service or system related to a location. More specifically, the third-party service or system module 1722 identifies any third-party services or systems with which the user may want to interact based on their location and identification. The third-party service or system module 1722 is coupled to receive the location, the identity and information from other modules and determine what actions or services that the third-party service or system can provide that are relevant for a given location and user. The third-party service or system module 1722 provides communication protocols for communication with the third-party service or system. In some implementations, the third-party service or system module 1722 provides a link to perform the action or transaction on an identified third-party service or system to the notification generation module 1710 for incorporation into the notification. It should be understood that the third-party service or system module 1722 also receives information from the user and cooperates with the other components of the real world interaction module 1503 to perform the action or transaction with the third-party service or system 1722. For example, the third-party service or system module 1722 can interact with a third-party payment service to arrange for payment for goods or services provided at the location. The third-party service or system module 1722 interacts with the user to secure approval of payment, or automatically approves the payment based on preferences of the user that may be stored in the place preference module 1732. Examples of the automatic payment are described with reference to FIG. 3B and other figures. In some implementations, the third-party service or system module 1722 also records interactions and transactions in the places and real world content data storage 1726. For example, since the third-party service or system module 1722 is responsible for executing transactions with third-party systems or services 1507, the third-party service or system module 1722 stores information including the identification of the user, the time of the transaction, the place of the transaction, the location of the transaction, the initiation of the transaction, the completion of the transaction, and other metadata associated with the transaction. In some implementations, the third party service may be any other service(s) provided by the system 1500 or other third party server 1507, for example, a payment service, a reservation service, a check-in service, a check out service, a ordering service, a confirmation service, a notification service, an accessing (opening, closing, locking or unlocking) service, a communication service, a location service, a language translation service, a polling service, a verification service, a recording service or other service related to a place. In some implementations, the third-party service or system module 1722 is a set of instructions executable by the processor 1604. In some implementations, the third-party service or system module 1722 is stored in the memory 1606 of the social network server 1501 and is accessible and executable by the processor 1604. In some implementations, the third-party service or system module 1722 is adapted for cooperation and communication with the processor 1604, the memory 1606 and other components of the real world interaction module 1503a via the bus 1620.

The user interface module 1724 can be software or routines for generating a user interface element and providing it to the notification generation module 1710 for inclusion in a notification. The user interface module 1724 also generates updates to the user interface element. The user interface module 1724 is coupled to receive an initiation signal from the notification generation module 1710. The user interface module 1724 generates a user interface for inclusion in the notification. Example user interface elements produced by the user interface module 1724 are shown and described in more detail with reference to FIGS. 5A-5D and 10-14. The user interface module 1724 also receives changes to the user interface element and actions. The user interface module 1724 processes these changes to produce updates to the user interface element. In some implementations, the user interface module 1724 is a set of instructions executable by the processor 1604. In some implementations, the user interface module 1724 is stored in the memory 1606 of the social network server 1501 and is accessible and executable by the processor 1604. In some implementations, the user interface module 1724 is adapted for cooperation and communication with the processor 1604, the memory 1606 and other components of the real world interaction module 1503a via the bus 1620.

The places and real world context data storage 1726 is data storage for storing information about places and their associated locations. The places and real world context data storage 1726 also stores real world context data for use by the other components of the real world interaction module 1503. In some implementations, the places and real world context data storage 1726 stores information that can be accessed by user, by place, by location, etc. For example, places and real world context data storage 1726 may store a place history including events and activities for all the users that visited the place. More specifically, the place history for a place may include users that have visited, when the users visited, what actions the users do with regard to the place either while present at the place or topically related to the place, what third-party services related to the place were engaged and when, etc. In other words, the places and real world context data storage 1726 stores the data for real world interactions that are related to a place. The place history may also include other information provided by the owner of the place. In some implementations, a "place" is not a physical location but rather a conceptual grouping for information associated with an establishment, for example, a particular bar or restaurant. The "place" could also be the residence of the user, the office of a company, or any other real world location associated with an entity. While the bar or restaurant may change its location by moving from a first address to a second address, the information stored for the "place" will move with the place even though it has changed addresses/physical locations. The places and real world context data storage 1726 is coupled to the software communication mechanism 1620 to provide access to this information to the other components of the notification surfacing module.

The real world context and identity module 1728 can be software or routines for reviewing information retrieved by the user identity module 1704, the location determination module 1706 and the social network interface module 1708 to determine a context for an identified user. The real world interaction module 1503 knows the right thing to present to a user at the right time, and accomplishes this by using signals to determine: available services at a place, ranking of services/notifications available at a place, and appropriate time to suggest services to a user. The real world context and identity module 1728 retrieves information about the user and the real world and stores that data in the places and real world context data storage 1726. The real world context and identity module 1728 can later retrieve that information to improve the notifications that are generated by the notification generation module 1710. The real world context and identity module 1728 provides signals to the notification generation module 1710 that allow it to better filter and rank notifications for a given user. In some implementations, the real world context and identity module 1728 is configured to create and maintain a real world identity for the user. The real world identity for a user is built up over time and is a record of places visited, actions taken at those places visited, transactions executed with third-party systems and the time and place of those transactions, and other actions that are performed by the user with regard to particular locations. The real world context and identity module 1728 may also perform analysis of the interaction(s) to define at least one real world moment and store the real world moment in the place history associated with the user. For example, the real world context and identity module 1728 may store the interactions, transactions, moments and real world identity in the places and real world context data storage 1726. In general, throughout this application, a real world moment is any action or activity that is taken by the user that is inherently tied to the user being at the place (e.g., arriving or leaving, taking a photo, being physically co-present with other people, etc.) In some implementations, it differs from other actions in that a user can write a post about a restaurant while the user is not present at the restaurant. In some implementations, the real world context and identity module 1728 is a set of instructions executable by the processor 1604. In some implementations, the real world context and identity module 1728 is stored in the memory 1606 of the social network server 1501 and is accessible and executable by the processor 1604. In some implementations, the real world context and identity module 1728 is adapted for cooperation and communication with the processor 1604, the memory 1606 and other components of the real world interaction module 1503*a* via the bus 1620.

The place history module 1730 can be software or routines for creating and maintaining place histories. The place history module 1730 cooperates with the other components of the real world interaction module 1503*a* to create personalized and customized place histories or place history streams that represent the history of a person at a place they visit. A place history stream can exist for any public establishment or place. For example, a place history stream can be created for restaurants, cafés, bars, nightclubs, retail stores, malls, stadiums, venues, parks, neighborhoods, etc. The place history stream for a particular place may have content that is contributed from various different sources (e.g., different users). For example, the customers or users of a place may provide content related to that place's history stream. Those customers or users control whether the content they provide is publicly available and accessible or whether it is viewable only by discrete sets of users, for example, particular people in groups they have defined in the social network. The owner of an establishment at a place can claim the place history associated with the place by using a page in the social network. The owner of an establishment can also provide content, for example, services offered at the location, information about the place, number of user visits, and other information as available from the real world interaction module 1503. In some implementations, an owner or user may moderate the content that is publicly available with regard to a place. In some implementations, when business owners claim Place History Streams, they can choose to add services available to users when they visit their place. The default service available at all places is the ability for users to post content to their Place History Stream via social network sharing tools. Consenting user and interact with other third party services, for example, Pay with Phone, may require consent to give the place/service the ability to see them during their visit, and access to perform an action (e.g., bill them) during their visit. The items that may appear in a Place History Stream include, but are not limited to: visits (arrive/depart); posts the user made while at the place (share); posts from friends at the place (share); posts about the place; photos taken at the place; transaction records at the place (pay) with third party services and systems, and application moments from the real world context and identity module 1728 or other third party applications. This content may be provided to the place history module 1730 from the social network interface module 1708, the action determination module 1716, the authorization module 1718, the device access module 1720, or the third-party service or system module 1722, for example. The place history module 1730 stores the place history stream in the places and real world content data storage 1726. In some implementations, Place History Streams can also be created for places like private residences or other user defined personal places. For example, a user may have a favorite hangout spot in a big park or at the beach and create that as a personal private place that's shared just with the user's friends. The visibility of these streams for private residences are controlled via an access control list, and there may be some verification of residence involved in the creation of this stream in a manner similar to how existing mapping systems use phone behavior, to learn Home and Work via location history. As mentioned above, Place History Streams may move with the place if an address changes. Should a business/establishment shut down, the Place History Stream should still remain visible to users with established history at the place. Users should still be able to access their Place History Stream for the closed business/establishment in the My Places section of the system when near the location. In some implementations, the place history module 1730 can organize information about a place according to the user or query the places and real world context data storage 1726 by user. The place history module 1730 may maintain a list of places a user has transacted with, both socially and via utility services. This list is found in a My Places list within the system, and allows the user to easily retrieve the Place History Streams of any place they have transacted with. The request for a place history may also be bounded by particular time windows. For example, the place history module 1730 may tell the user how many times they have visitor particular place in the last year or list all the bars that the user has visited the last six months. Example operations of the place history module 1730 are described in more detail with reference to FIGS. 6-9. In some implementations, the place history module 1730 is a set of instructions executable by the processor 1604. In some implementations, the place history module 1730 is stored in the memory 1606 of the social network server 1501 and is accessible and executable by the processor 1604. In some implementations, the place history module 1730 is adapted for cooperation and communication with the processor 1604, the memory 1606 and other components of the real world interaction module 1503*a* via the bus 1620.

The place preference module 1732 can be software or routines for creating a location-based user model for preferences. The place preference module 1732 observes user location, places and activities at places and builds the location-based user model for preferences. The model also defines the user preferences for what information can be disclosed, to whom information can be disclosed, and what actions or transactions are permitted to be performed automatically based on explicit or implicit information that the place preference module 1732 has gathered. For example, in generating notifications and interacting with the user, the real world interaction module 1503 generates and presents various consents. In response to those consent messages, the user accepts or rejects providing consent. The place preference module 1732 records the responses of the user and updates the location-based user model for preferences so that future actions of the same type at the same location may be automatically handled in the same manner. For example, if at a first restaurant the user authorizes their presence at that restaurant to be revealed publicly, the place preference module 1732 will record that preference and follow that same behavior for future visits of the user to the first restaurant. In contrast, if at a second restaurant the user does not approve of their presence been revealed to the public, the place preference module 1732 will record that preference and the user will operate in incognito mode not disclosing that they are at the second restaurant in future visits. Similarly, if a user authorizes or consents to use of an electronic payment system for a third restaurant automatically, the place preference module 1732 updates that user's preferences for the third restaurant and in future visits to the third restaurant, the electronic payment account of the user will automatically be charged for the user's meals there. In some implementations, the real world interaction module 1503 lets users know when their friends are nearby or even at the same place with them. This is accomplished by enabling "I'm here," a means to use presence to alert access control listed groups of a user's presence at a place/establishment while they visit. Activating presence at a place requires that the user consent to let their profile (e.g., photo, name, bio, etc.) be visible to access control listed parties while visiting the place. This consent can be set to automatically enabled whenever they visit the establishment, or whenever they visit places/establishments by type (e.g., all cafes, all bars but not at restaurants, etc.). The place preference module 1732 manages presence in the manner described above. In some implementations, the place preference module 1732 may also filter the access control listed groups even further to limit the presence to be sent only to users that are both in the access control listed groups and co-present at the same place. Example operations of the place preference module 1732 are described in more detail with reference to FIGS. 6-9. In some implementations, the place preference module 1732 is a set of instructions executable by the processor 1604. In some implementations, the place preference module 1732 is stored in the memory 1606 of the social network server 1501 and is accessible and executable by the processor 1604. In some implementations, the place preference module 1732 is adapted for cooperation and communication with the processor 1604, the memory 1606 and other components of the real world interaction module 1503*a* via the bus 1620.

In situations in which the systems, for example, the real world interaction module 1503*a* discussed here, collect personal information about users, or may make use of personal information, the users may be provided with an opportunity to control whether programs or features collect user information (e.g. information about a user's social network, social actions or activities, profession, a user's preferences, or a user's current location), or to control whether and/or how to receive content from the real world interaction module 1503*a* that may be more relevant to the user. In addition, certain data may be treated in one or more ways before it is stored or used so that personally identifiable information is removed. For example, a user's identity may be treated so that no personally identifiable information can be determined for the user, or a user's geographic location may be generalized where location information is obtained (e.g., to a city, ZIP code, or state level), so that a particular location of a user cannot be determined. Thus, the user may have control over how information is collected about the user and used by the real world interaction module 1503*a*.

Systems and methods for storing real world interactions based on location have been described. While the present disclosure is described in the context of a social network, it should be understood that the terms "products" and "services" are used interchangeably throughout this specification and are used herein to encompass their plain and ordinary meaning including, but not limited to any online service, online product, online software that provides services to users.

In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to user interfaces and particular hardware. Moreover, the technologies disclosed above primarily in the context of online services; however, the disclosed technologies apply to other data sources and other data types (e.g., collections of other resources, for example images, audio, web pages).

Reference in the specification to "one implementation" or "an implementation" means that a particular feature, structure, or characteristic described in connection with the implementation is included in at least one implementation of the disclosed technologies. The appearances of the phrase "in one implementation" in various places in the specification are not necessarily all referring to the same implementation.

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers or the like.

These and similar terms can be associated with the appropriate physical quantities and can be considered labels applied to these quantities. Unless specifically stated otherwise as apparent from the prior discussion, it is appreciated that throughout the description, discussions utilizing the terms, for example, "processing," "computing," "calculating," "determining," "displaying," or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, for example, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The disclosed technologies can take the form of an entirely hardware implementation, an entirely software implementation or an implementation containing both hardware and software elements. In some implementations, the technology is implemented in software, which includes but is not limited to firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A computer-implemented method comprising:
   determining, using one or more processors, an identification for a user;
   determining, using the one or more processors, a location of the user;
   determining, using the one or more processors, a place associated with the location, the place being a conceptual grouping of information associated with an establishment;
   identifying, using the one or more processors, an interaction with the establishment capable of being performed at the place for the identification;
   communicating, using the one or more processors, with a service to perform the interaction;
   performing, using the one or more processors, analysis of the interaction to define a real world moment, the real world moment being an action taken by the user that is inherently tied to the user being at the place; and
   storing, using the one or more processors, the real world moment in a place history associated with the identification.

2. The method of claim 1 comprising:
   retrieving the place history associated with the identification; and
   processing at least one real world moment from the place history to determine a suggested action for the user to perform based on location.

3. The method of claim 1 comprising:
   retrieving a history of the user with the place;
   determining whether the user has visited the place more than a predetermined number of times; and
   updating a location-based user preference model for the user associated with the identification if the user has visited the place more than a predetermined number of times.

4. The method of claim 3 comprising:
   determining whether a preference modification requires user confirmation;
   generating and sending a preference change notification to the user for approval;
   receiving approval; and
   updating the location-based user preference model for the user associated with the identification.

5. The method of claim 1 comprising:
   accessing a location-based user preference model for the user associated with the identification;
   determining whether the location-based user preference model includes a consent to perform the interaction; and wherein the interaction includes generating and sending an arrival notification indicating that the user is present at the place.

6. The method of claim 1 comprising:
accessing a location-based user preference model for the user associated with the identification;
determining whether the location-based user preference model includes a consent to perform the interaction; and
wherein the interaction includes a transaction with the service.

7. The method of claim 6 wherein the transaction is one from the group of: checking in at a restaurant, paying a bill, checking into a hotel, placing an order, confirming presence, notifying others of presence, and accessing an area.

8. A computer program product comprising a non-transitory computer usable medium including a computer readable program, wherein the computer readable program when executed on a computer causes the computer to:
determine an identification for a user;
determine a location of the user;
determine a place associated with the location, the place being a conceptual grouping of information associated with an establishment;
identify an interaction with the establishment capable of being performed at the place for the identification;
communicate with a service to perform the interaction;
perform analysis of the interaction to define a real world moment, the real world moment being an action taken by the user that is inherently tied to the user being at the place; and
store the real world moment in a place history associated with the identification.

9. The computer program product of claim 8 wherein the computer readable program when executed on a computer also causes the computer to:
retrieve the place history associated with the identification; and
process at least one real world moment from the place history to determine a suggested action for the user to perform based on location.

10. The computer program product of claim 8 wherein the computer readable program when executed on a computer also causes the computer to:
retrieve a history of a user with the place;
determine whether the user has visited the place more than a predetermined number of times; and
update a location-based user preference model for the user associated with the identification if the user has visited the place more than a predetermined number of times.

11. The computer program product of claim 10 wherein the computer readable program when executed on a computer also causes the computer to:
determine whether a preference modification requires user confirmation;
generate and send a preference change notification to the user for approval;
receive approval; and
update the location-based user preference model for the user associated with the identification.

12. The computer program product of claim 8 wherein the computer readable program when executed on a computer also causes the computer to:
access a location-based user preference model for the user associated with the identification;
determine whether the location-based user preference model includes a consent to perform the interaction; and
wherein the interaction includes generating and sending an arrival notification indicating that the user is present at the place.

13. The computer program product of claim 8 wherein the computer readable program when executed on a computer also causes the computer to:
access a location-based user preference model for the user associated with the identification;
determine whether the location-based user preference model includes a consent to perform the interaction; and
wherein the interaction includes a transaction with the service.

14. The computer program product of claim 13 wherein the transaction is one from the group of: checking in at a restaurant, paying a bill, checking into a hotel, placing an order, confirming presence, notifying others of presence, and accessing an area.

15. A system comprising:
a processor; and
a memory storing instructions that, when executed, cause the system to:
determine an identification for a user;
determine a location of the user;
determine a place associated with the location, the place being a conceptual grouping of information associated with an establishment;
identify an interaction with the establishment capable of being performed at the place for the identification;
communicate with a service to perform the interaction;
perform analysis of the interaction to define a real world moment, the real world moment being an action taken by the user that is inherently tied to the user being at the place; and
store the real world moment in a place history associated with the identification.

16. The system of claim 15 wherein the memory also stores instructions that, when executed, cause the system to:
retrieve the place history associated with the identification; and
process at least one real world moment from the place history to determine a suggested action for the user to perform based on location.

17. The system of claim 15 wherein the memory also stores instructions that, when executed, cause the system to:
retrieve a history of a user with the place;
determine whether the user has visited the place more than a predetermined number of times; and
update a location-based user preference model for the user associated with the identification if the user has visited the place more than a predetermined number of times.

18. The system of claim 17 wherein the memory also stores instructions that, when executed, cause the system to:
determine whether a preference modification requires user confirmation;
generate and send a preference change notification to the user for approval;
receive approval; and
update the location-based user preference model for the user associated with the identification.

19. The system of claim 15 wherein the memory also stores instructions that, when executed, cause the system to:
access a location-based user preference model for the user associated with the identification;

determine whether the location-based user preference model includes a consent to perform the interaction; and wherein the interaction includes generating and sending an arrival notification indicating that the user is present at the place.

20. The system of claim 15 wherein the memory also stores instructions that, when executed, cause the system to:

access a location-based user preference model for the user associated with the identification;

determine whether the location-based user preference model includes a consent to perform the interaction; and wherein the interaction includes a transaction with the service.

21. The system of claim 20 wherein the transaction is one from the group of: checking in at a restaurant, paying a bill, checking into a hotel, placing an order, confirming presence, notifying others of presence, and accessing an area.

* * * * *